(12) United States Patent
Nagai et al.

(10) Patent No.: US 12,292,314 B2
(45) Date of Patent: May 6, 2025

(54) OPTICAL ENCODER

(71) Applicant: Panasonic Intellectual Property Management Co., Ltd., Osaka (JP)

(72) Inventors: Shuichi Nagai, Osaka (JP); Masaru Shiraishi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/547,649

(22) PCT Filed: Feb. 22, 2022

(86) PCT No.: PCT/JP2022/007124
§ 371 (c)(1),
(2) Date: Aug. 23, 2023

(87) PCT Pub. No.: WO2022/185990
PCT Pub. Date: Sep. 9, 2022

(65) Prior Publication Data
US 2024/0302188 A1 Sep. 12, 2024

(30) Foreign Application Priority Data
Mar. 4, 2021 (JP) ................... 2021-034795

(51) Int. Cl.
*G01D 5/347* (2006.01)
(52) U.S. Cl.
CPC ................... *G01D 5/3473* (2013.01)
(58) Field of Classification Search
CPC .................................................. G01D 5/3473
See application file for complete search history.

(56) References Cited

U.S. PATENT DOCUMENTS

| 5,747,797 | A | 5/1998 | Fujita | |
|---|---|---|---|---|
| 10,782,160 | B2 * | 9/2020 | Konishi | ............... G01D 5/3473 |
| 11,162,820 | B2 * | 11/2021 | Wang | ....................... G02B 5/08 |

FOREIGN PATENT DOCUMENTS

| JP | H08-278167 A | 10/1996 |
|---|---|---|
| JP | 2011-145118 A | 7/2011 |
| JP | 2014-025713 A | 2/2014 |

OTHER PUBLICATIONS

International Search Report dated May 17, 2022 issued in International Patent Application No. PCT/JP2022/007124, with English translation.

* cited by examiner

*Primary Examiner* — Seung C Sohn
(74) *Attorney, Agent, or Firm* — Rimon P.C.

(57) ABSTRACT

Optical encoder includes a light source, a reflector, and a light receiver. Reflector has a plurality of reflection areas that include M-code areas and reflects a light from light source by one or more areas, corresponding to n-bits, of M-code areas. Light receiver receives a reflection light from reflector to perform a photoelectric conversion on reflection light. M-code areas has a first face corresponding to first code information and a second face corresponding to second code information and having an inclination structure different from that of first face. Light receiver has first and second light-receiving groups. First light-receiving group includes a plurality of first light-receiving elements receiving reflection light reflected from first face. Second light-receiving group includes a plurality of second light-receiving elements receiving reflection light reflected from second face. Positions of first light-receiving elements and positions of second light-receiving elements are shifted from each other in one direction.

19 Claims, 15 Drawing Sheets

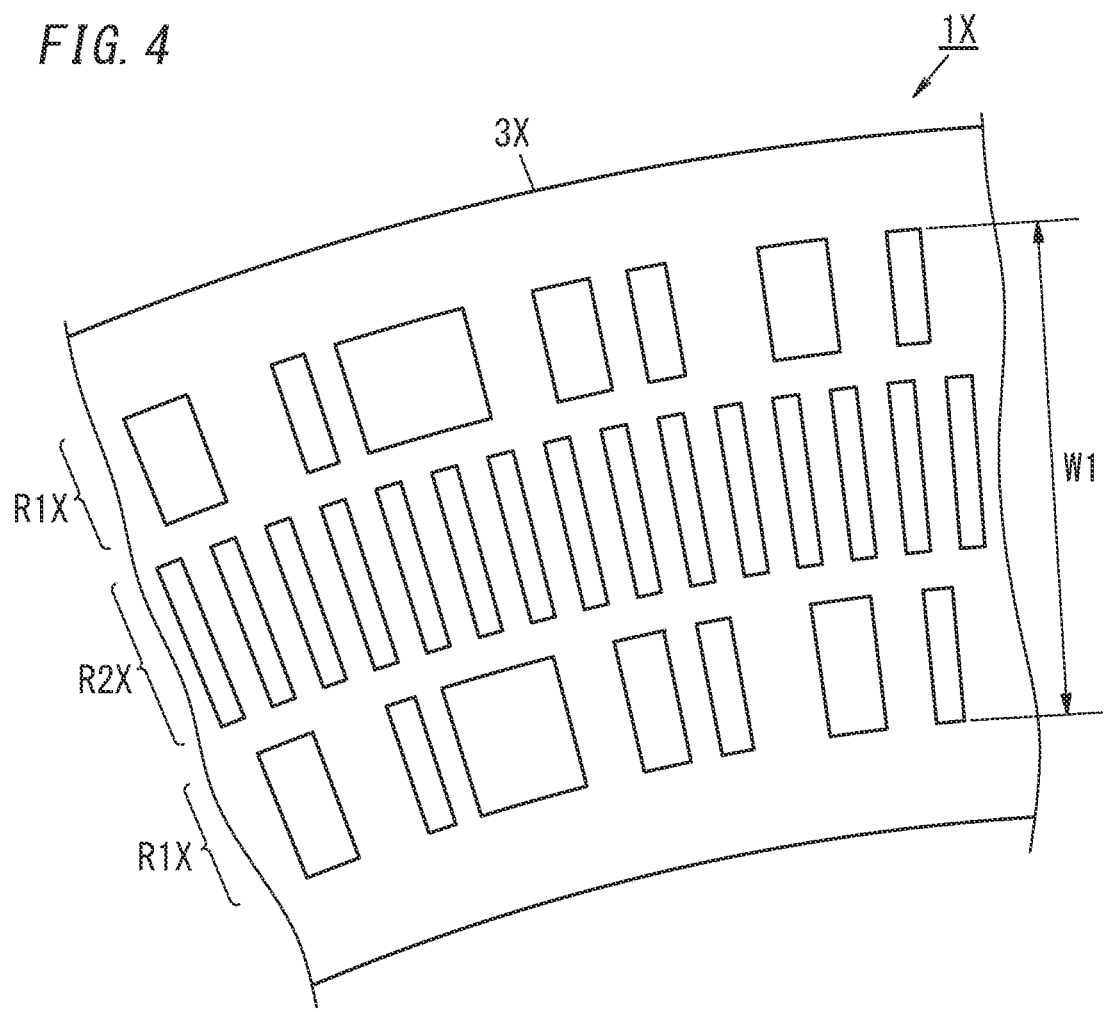

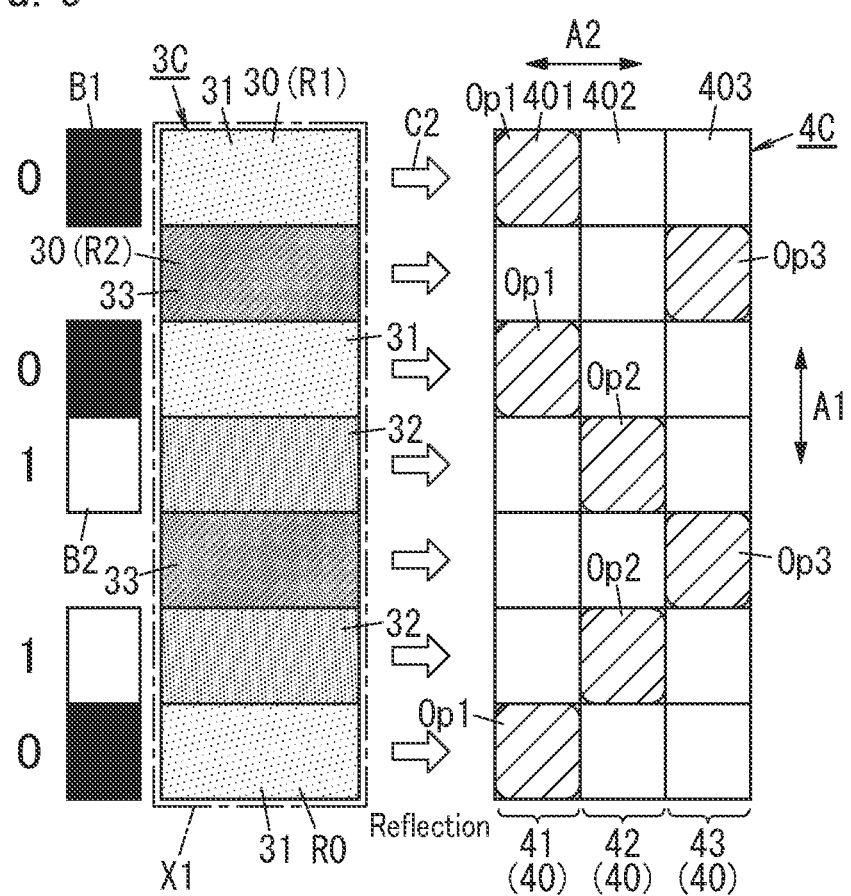

OPTICAL ENCODER

CROSS-REFERENCE OF RELATED APPLICATIONS

This application is the U.S. National Phase under 35 U.S.C. § 371 of International Patent Application No. PCT/JP2022/007124, filed on Feb. 22, 2022, which in turn claims the benefit of Japanese Patent Application No. 2021-034795, filed on Mar. 4, 2021, the entire disclosures of which Applications are incorporated by reference herein.

TECHNICAL FIELD

The present disclosure relates generally to optical encoders. More specifically, the present disclosure relates to a reflective optical encoder.

BACKGROUND ART

Patent Literature 1 discloses a reflective optical encoder. This reflective optical encoder includes a light source, a reflection scale, a light detecting unit, and a calculation unit. The reflection scale is a circular plate attached to a rotation shaft which is a measurement object. In this reflective optical encoder, reflection lights from two first reflection parts of the reflection scale are received by two first light receiving parts of the light detecting unit. Moreover, in this reflective optical encoder, reflection lights from two second reflection parts having inclinations different from the first reflection parts are received by two second light receiving parts of the light detecting unit. The calculation unit performs a calculation based on outputs of the first light receiving parts and the second light receiving parts.

CITATION LIST

Patent Literature

Patent Literature 1: JP2011-145118A

SUMMARY OF INVENTION

Generally, thinning a whole shape is easier in a reflective optical encoder than in a transmissive optical encoder. However, in the reflective optical encoder, the amount of light to be received by a light receiver tends to be small. Especially, providing a countermeasure function with respect to a phase shift of a light-receptive signal or a function for detecting an error caused by an entered foreign material and the like may cause a problem of the reduction in sensitivity caused by the insufficiency in the amount of light reception in the light receiver, for example.

The present disclosure is achieved in view of the above circumstances, and an object thereof is to provide an optical encoder contributing to remedying the insufficiency in the amount of light reception in the light receiver.

An optical encoder according to an aspect of the present disclosure includes a light source, a reflector, and a light receiver. The reflector has a plurality of reflection areas that include a plurality of M-code areas arranged in one line according to a specific bit pattern representing an M-code. The reflector is configured to move together with a movement of an object and is configured to reflect a light from the light source by one or more areas, corresponding to n-bits, of the plurality of M-code areas, where "n" is a natural number. The light receiver is configured to receive a reflection light from the reflector to perform a photoelectric conversion on the reflection light. The plurality of M-code areas have a first face corresponding to first code information which is one kind of one-bit information of the M-code, and a second face corresponding to second code information which is another kind of the one-bit information of the M-code. The second face has an inclination structure different from that of the first face. The light receiver has a first light-receiving group and a second light-receiving group. The first light-receiving group includes a plurality of first light-receiving elements arranged in one direction to receive the reflection light reflected from the first face. The second light-receiving group is disposed on a side farther away from the reflector than the first light-receiving group is. The second light-receiving group includes a plurality of second light-receiving elements arranged along the one direction to receive the reflection light reflected from the second face. The first light-receiving group and the second light-receiving group are arranged such that positions of the first light-receiving elements and positions of the second light-receiving elements are shifted from each other in the one direction.

An optical encoder according to another aspect of the present disclosure includes a light source, a reflector, and a light receiver. The reflector has a plurality of reflection areas that include a plurality of code areas arranged in one line according to a specific bit pattern. The reflector is configured to move together with a movement of an object and is configured to reflect a light from the light source by one or more areas, corresponding to n-bits, of the plurality of code areas, where "n" is a natural number. The light receiver is configured to receive a reflection light from the reflector to perform a photoelectric conversion on the reflection light. The reflector has three or more kinds of reflection areas having inclination structures different from one another. The light receiver has three or more light-receiving groups respectively corresponding to and receiving light from the three or more kinds of reflection areas.

BRIEF DESCRIPTION OF DRAWINGS

FIG. 4 is a schematic view of a reflector according to a comparative example, which is illustrated for explaining advantages of the optical encoder according to the embodiment;

FIG. 6 is a view illustrating a positional relationship between a reflector and a light receiver of an optical encoder according to a second variation of the embodiment;

DESCRIPTION OF EMBODIMENTS

Embodiment

An optical encoder 1 according to an embodiment will now be described with reference to FIGS. 1A to 3. The drawings to be referred to in the following description of embodiments and the like are all schematic representations. That is to say, the ratio of the dimensions (including thicknesses) of respective constituent elements illustrated on the drawings does not always reflect their actual dimensional ratio.

(1) Overview

Figure 1A:
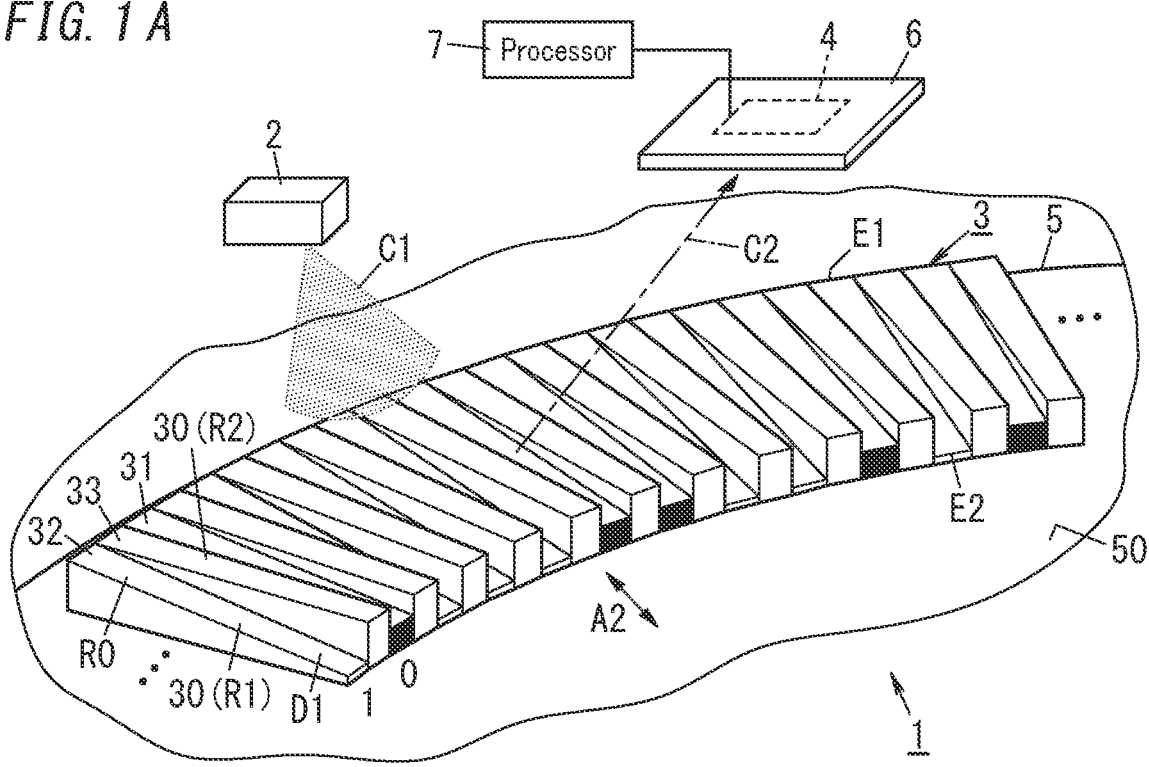
FIG. 1A is a schematic perspective view of a main part of an optical encoder according to an embodiment.
Figure 1B:
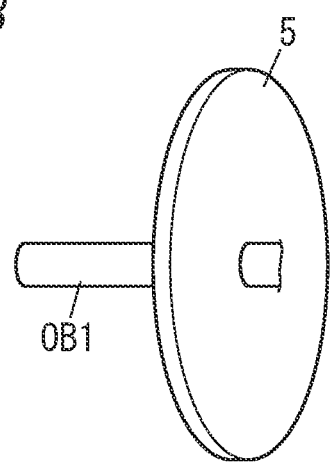
FIG. 1B is a schematic perspective view of a part of a measurement object and a rotating plate for the optical encoder according to the embodiment.
Figure 2:
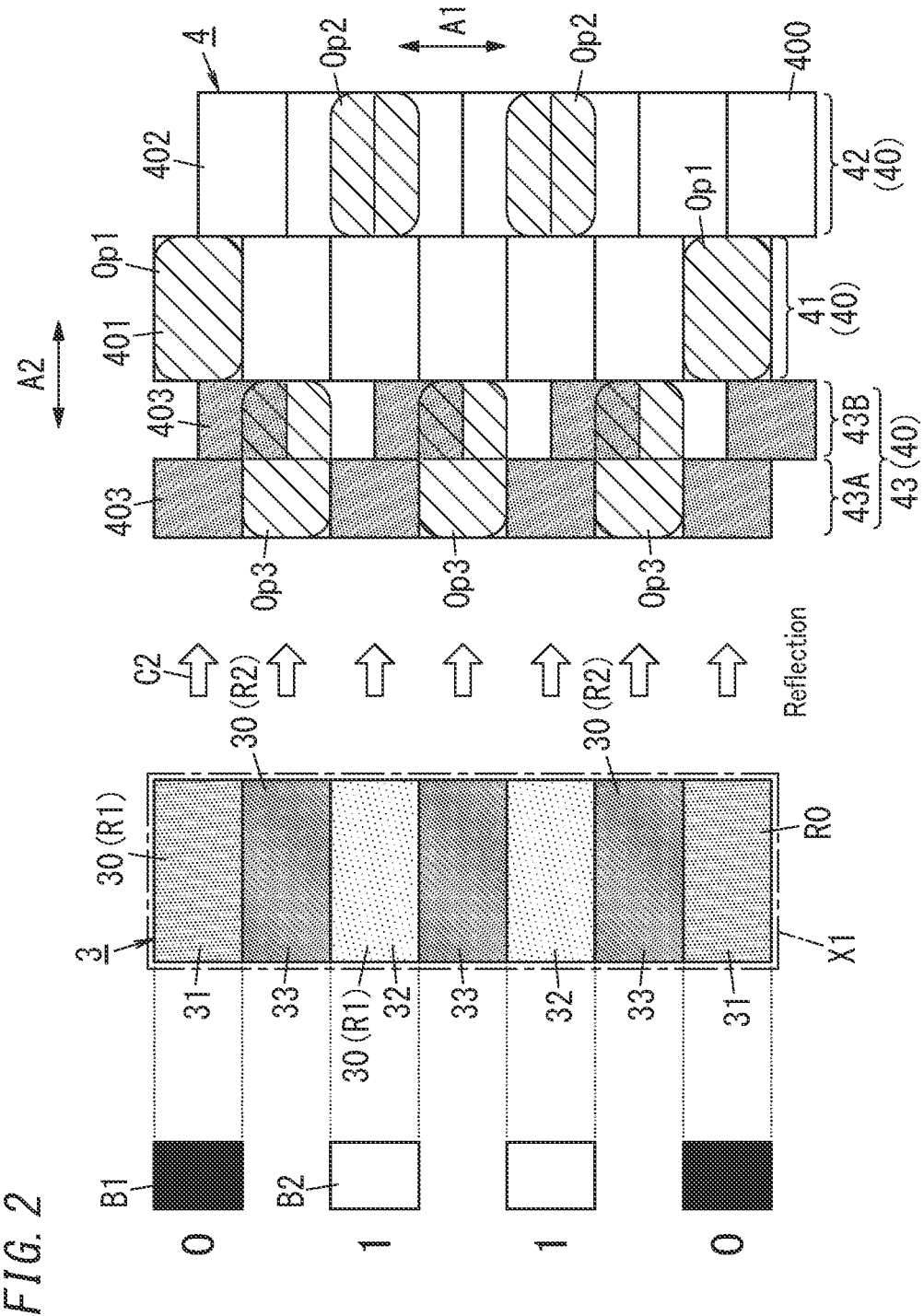
FIG. 2 is a view illustrating a positional relationship between a reflector and a light receiver of the optical encoder according to the embodiment.

An overview of the optical encoder 1 according to the present embodiment is described first with reference to FIGS. 1A to 2.

The optical encoder 1 according to an aspect of the embodiment is a rotary encoder, and an object (measurement object OB1) for the optical encoder 1 is a rotor (refer to FIG. 1B), as an example. The optical encoder 1 may be built in a servomotor for example, and may be configured to measure a rotational movement (rotation angle or rotational position) of a rotation shaft of the servomotor which is the measurement object OB1 and output information relating to a measurement result. According to the present disclosure, the optical encoder 1 is not limited to the rotary encoder but may be a linear encoder configured to measure a linear movement.

Specifically, the optical encoder 1 includes a light source 2, a reflector 3, and a light receiver 4, as shown in FIG. 1A. The reflector 3 has a plurality of reflection areas 30 that include a plurality of M-code areas R1 arranged in one line according to a specific bit pattern representing an M-code. The "M-code (M-sequence code)" used herein is constituted by $2^n$ pieces of code information per one cycle, where "n" is a natural number and each piece of code information represents "0" or "1". In the code, sequential "n" pieces of code information (each being "0" or "1") (i.e., information of n-bits) starting from an arbitrary point of the code is unique in the code. The code has "$2^n$" pieces of information not duplicated to one another in a whole circumference of the code. The reflector 3 is configured to move together with a movement of the object (measurement object OB1), and is configured to reflect a light from the light source 2 by one or more areas (detection area X1; refer to FIG. 2), which corresponds to n-bits, of the plurality of M-code areas R1. For example, in a case of 4-bits, the "M-code" has $2^4$ pieces of information not duplicated to one another in the whole circumference, and the reflector 3 reflects a light from the light source 2 by a detection area X1 corresponding to 4-bits. In short, the optical encoder 1 is a reflective and optical absolute encoder based on the M-sequence, as an example.

The light receiver 4 is configured to receive a reflection light C2 from the reflector 3. The light receiver 4 is configured to receive the reflection light C2 to perform a photoelectric conversion on the reflection light C2. The plurality of M-code areas R1 have: a first face 31 corresponding to first code information B1 which is one kind of one-bit information of the M-code; and a second face 32 corresponding to second code information B2 which is another kind of the one-bit information of the M-code. The second face 32 has an inclination structure D1 different from that of the first face 31. In the embodiment, the first code information B1 is "0" of the one-bit information (0, 1), and the second code information B2 is "1" of the one-bit information (0, 1). As used herein, the feature "the inclination structure D1 of the first face 31 and the inclination structure D1 of the second face 32 are different from each other" indicates that they have faces whose inclined angles with respect to a reference plane (including a front surface of a rotating plate 5, for example) are different from each other. In the example of FIG. 1A, the first face 31 corresponding to a piece of information "0" has an inclined angle smaller than that of the second face 32 corresponding to a piece of information "1."

As shown in FIG. 2, the light receiver 4 has a first light-receiving group 41 and a second light-receiving group 42. The first light-receiving group 41 includes a plurality of first light-receiving elements 401 arranged in one direction (line direction A1) to receive the reflection light C2 reflected from the first face 31. The second light-receiving group 42 is disposed on a side farther away from the reflector 3 than the first light-receiving group 41 is. The second light-receiving group 42 includes a plurality of second light-receiving elements 402 arranged along the line direction A1 to receive the reflection light C2 reflected from the second face 32. The first light-receiving group 41 and the second light-receiving group 42 are arranged such that positions of the first light-receiving elements 401 and positions of the second light-receiving elements 402 are shifted from each other in the line direction A1.

According to this configuration, the reflector 3 has the plurality of reflection areas 30 that include the plurality of M-code areas R1 arranged in the one line, and the first light-receiving elements 401 and the second light-receiving elements 402 that receive the reflection light C2 are positionally shifted from each other in the one direction (line direction A1). Accordingly, the optical encoder 1 has a structure for chattering countermeasure of providing light-receptive signals phase-shifted to each other, for example, by a half phase such that any one of the signals can be detected to reduce the chance that the chattering causes a difficulty in determination whether information is "0" or "1." Moreover, the optical encoder 1 can contribute to increasing (almost twice) the amount of light reception in the light receiver 4. Specifically, compared to a case where a plurality of M-code areas R1 are provided in each of two lines as the countermeasure to the phase shift, it is possible to increase the amount of light reception in the light receiver 4. It is consequently possible to remedy the insufficiency in the amount of light reception in the light receiver 4.

According to the present disclosure, the optical encoder 1 is not limited to the configuration where the "specific bit pattern" represents the M-code. According to another aspect of the present embodiment, an optical encoder 1 includes a light source 2, a reflector 3, and a light receiver 4. The reflector 3 has a plurality of reflection areas 30 that include a plurality of code areas R0 arranged in one line according to a specific bit pattern. The reflector 3 is configured to move together with a movement of an object (measurement object OB1), and is configured to reflect a light from the light source 2 by one or more areas (detection area X1), which corresponds to n-bits, of the plurality of code areas R0, where "n" is a natural number. The light receiver 4 is configured to receive a reflection light C2 from the reflector 3 to perform a photoelectric conversion on the reflection light C2. The reflector 3 has three or more kinds of reflection areas 30 having inclination structures D1 different from one another. The light receiver 4 has three or more light-receiving groups 40 respectively corresponding to and receiving light from the three or more kinds of reflection areas 30. According to this configuration, the reflector 3 has the plurality of reflection areas 30 that include the plurality of code areas R0 arranged in the one line, and the light receiver 4 has the three or more light-receiving groups 40 respectively corresponding to and receiving light from the three or more kinds of reflection areas 30. As a result, compared to a case where a plurality of code areas R0 are provided in each of a plurality of lines, it is possible to increase the amount of light reception in the light receiver 4. It is consequently possible to remedy the insufficiency in the amount of light reception in the light receiver 4.

(2) Details

Next, details of the optical encoder 1 according to the present embodiment is described with reference to FIGS. 1A to 3.

(2.1) Whole Configuration

As shown in FIG. 1A, the optical encoder 1 according to the present embodiment includes the light source 2, the reflector 3, the light receiver 4, the rotating plate 5, a board 6, and a processor 7.

FIG. 1A is a schematic view illustrating a whole configuration of the optical encoder 1. The light source 2, the light receiver 4, the rotating plate 5, the board 6 (printed board), the processor 7 and any other elements may be housed in or held by a housing which is omitted to be illustrated in FIG. 1A. In FIG. 1A, the rotating plate 5 is expanded and only a part thereof is illustrated. In the example of FIG. 1A, only the light receiver 4 out of the light source 2, the processor 7, and the light receiver 4 is provided to the board 6. In an alternative example, the light source 2, the processor 7 or the like may be provided to the same board 6.

The light source 2 is a diffused light source or a point light source with a comparatively small light emitting surface. The light source 2 includes a light emitting diode (LED) or a laser diode. The light source 2 may further include a collimator lens. The light source 2 is disposed to face one surface 50 of the rotating plate 5 on which the reflector 3 is disposed, and is configured to emit a light (outgoing light C1) toward the reflector 3. The light source 2 may be mounted on the board 6, or on a board different from the board 6.

The rotating plate 5 is a member having the one surface 50 (upper surface in FIG. 1A) to which the reflector 3 is provided. The rotating plate 5 may be a member having a circular or a ring torus shape and may be made by resin molding, for example. The optical encoder 1 is a rotary encoder as described above, and the rotating plate 5 is attached to a rotation shaft (measurement object OB1) of a servomotor or the like. The rotating plate 5 is configured to move (rotate) together with a movement (rotation) of the measurement object OB1.

The reflector 3 is a member configured to reflect the outgoing light C1 from the light source 2. The reflector 3 is provided to the rotating plate 5 that rotates together with the rotation of the measurement object OB1. The reflector 3 has a circular ring shape when viewed along an axial direction of the rotating plate 5. The center axis of the reflector 3 and the center axis of the rotating plate 5 are substantially coincident with each other. The reflector 3 includes a resin layer and a metal film. The resin layer may be constituted by a part of the rotating plate 5. The metal film is disposed to face the light source 2 to reflect the outgoing light C1. The material of the metal film is not limited as long as the metal film can reflect the outgoing light C1. The metal film may be formed on the resin layer by the deposition or plating of gold, silver, aluminum, or chromium.

The reflector 3 may be formed over the whole circumference of the rotating plate 5 in a circumferential direction, for example. The reflector 3 is configured such that the absolute angular position in one rotation of the rotation shaft (measurement object OB1) is identifiable. In the embodiment, the reflector 3 has the plurality of reflection areas 30 that include the plurality of code areas R0 arranged in one line according to a specific bit pattern. As described above, in the embodiment in an example, the "specific bit patter" represents the M-code, and the code areas R0 include the M-code areas R1. The plurality of reflection areas 30 are arranged in one line that draws one circle around the center axis of the rotating plate 5.

The reflector 3 is disposed to reflect the outgoing light C1 from the light source 2 by (at least) the detection area X1 corresponding to n-bits, out of the plurality of code areas R0 (M-code areas R1). That is, the optical encoder 1 is set such that at least the detection area X1 is irradiated with the outgoing light C1 from the light source 2. FIG. 2 shows an example where the detection area X1 corresponds to 4-bits. In the example of FIG. 2, seven reflection areas 30 are present in the detection area X1 and four of them correspond the M-code areas R1.

The plurality of M-code areas R1 have: a plurality of first faces 31 each of which corresponds to the first code information B1 (in the embodiment, "0" of the one-bit information (0, 1)); and a plurality of second faces 32 each of which corresponds to the second code information B2 (in the embodiment, "1" of the one-bit information (0, 1)). In the example shown in FIG. 2, the rotating plate 5 is located at a rotational position where a first face 31, a second face 32, a second face 32, and a first face 31 enter the detection area X1, which correspond to the 4-bits information "0, 1, 1, 0." Therefore, in response to the outgoing light C1 reflected by the M-code areas R1, the light receiver 4 side outputs a signal corresponding to the digital information "0, 1, 1, 0," and as a result an absolute angular position (such as "45 degrees" or any other degrees) corresponding to the digital information "0, 1, 1, 0" is obtained in the processor 7 by calculation.

Each first face 31 is an inclined surface. The first face 31 is inclined with respect to a virtual plane (hereinafter, the virtual plane may be referred to as a "reference plane") perpendicular to the center axis of the rotation shaft (measurement object OB1), for example. In the present embodiment as an example, the reference plane is substantially parallel to a flat one surface 50 of the rotating plate 5, and the first face 31 is inclined with respect to the one surface 50.

To facilitate the easy understanding of the correspondence relationship between the one-bit information (0, 1) and the reflection area 30, FIG. 2 shows a black block indicating the first code information B1 "0" and a white block representing the second code information B2 "1," but they are unsubstantial members and do not exist.

Each second face 32 is an inclined surface. The second face 32 is inclined with respect to the reference plane and thus inclined with respect to the one surface 50. The second face 32 has an inclination structure D1 different from that of the first face 31. In the present embodiment, the second face 32 has the inclination structure D1 whose inclined angle with respect to the reference plane is different from that of the first face 31. As an example, in the embodiment, inclined angles θ1 and θ2 are set to satisfy a relation "0<θ1<θ2," where θ1 denotes an inclined angle of the first face 31 with respect to the reference plane and θ2 denotes an inclined angle of the second face 32 with respect to the reference plane. In an alternative example, the inclined angles θ1 and θ2 may be set to satisfy a relation "0<θ2<θ1."

In the present embodiment, each of the plurality of reflection areas 30 has an outer edge E1 and an inner edge E2 in a radial direction A2 (refer to FIG. 1A) of the reflector 3. In the present embodiment, relying on the positional relationship with respect to the light source 2 and the light receiver 4, the first faces 31 and the second faces 32 are each inclined such that the outer edge E1 is raised with respect to the inner edge E2 in the radial direction A2. Specifically, when viewed along the axial direction of the rotating plate 5, the light source 2 and the light receiver 4 are arranged along the radial direction A2. The light source 2 is disposed on an outer side than the light receiver 4 in the radial direction A2. Each of the first face(s) 31 and the second face(s) 32 is inclined to be closer the light receiver 4 (farther away from the one surface 50 of the rotating plate 5) at the outer side in the radial direction A2 than at the center of the reflector 3 such that the outgoing light C1 of the light source 2 reflected by the reflector 3 travels toward the light receiver 4.

In the embodiment, heights of the outer edges E1 of the plurality of reflection areas 30 with respect to the one surface 50 of the rotating plate 5 are equal to each other for the first face 31 and the second face 32 (refer to FIG. 1A). On the other hand, heights of the inner edges E2 of the plurality of reflection areas 30 with respect to the one surface 50 of the rotating plate 5 are different from each other for the first face 31 and the second face 32 (refer to FIG. 1A). The inner edges E2 of the first faces 31 are positioned above the inner edges E2 of the second faces 32, such that the inclined angles θ1 and θ2 satisfy the relation "0<θ1<θ2."

Note that, in FIG. 2, different inclined angles of the plurality of reflection areas 30 of the reflector 3 are shown by different densities of the dots. In the figure, the reflection areas 30 having the same densities of the dots have the same inclined angle.

The plurality of reflection areas 30 further include a plurality of incremental areas R2. As an example, in the present embodiment, the plurality of incremental areas R2 are periodically arranged at predetermined intervals in the same line as the plurality of M-code areas M1. The plurality of incremental areas R2 correspond to an incremental track. That is, as an example, the optical encoder 1 is an encoder including both an absolute track and the incremental track, and has a specific structure where these tracks are realized in one line. Note that the incremental areas R2 are provided in order to obtain a signal based on an incremental method to measure the relative positional change. In response to the outgoing light C1 reflected by the incremental areas R2, an output signal of the light receiver 4 side is turned ON. According to the rotation of the rotating plate 5, this output signal is repeatedly changed between ON and OFF to form pulsed signals (analog signal).

In the present embodiment as an example, the M-code areas R1 and the incremental areas R2 are alternately disposed. That is, one incremental area R2 is interposed between adjacent two M-code areas R1. In the example of FIG. 2, the detection area X1 corresponding to the 4-bits includes three incremental areas R2, in addition to the four M-code areas R1. Note that, when the rotating plate 5 rotates from the state shown in FIG. 2 by an angle corresponding to one reflection area 30, three M-code areas R1 and four incremental areas R2 are to be included within the detection area X1.

The plurality of incremental areas R2 have faces (hereinafter, referred to as a "third face(s) 33"), each of which has an inclination structure D1 different from any of those of the first face(s) 31 and the second face(s) 32. In other words, the reflector 3 of the present embodiment has three kinds of reflection areas 30 having inclination structures D1 different from one another.

In the present embodiment as an example, each third face 33 is substantially parallel to the reference plane and thus is substantially parallel to the one surface 50. Therefore, inclined angles satisfy a relation "θ3~0<θ1<θ2," where θ3 denotes an inclined angle of the third face 33 with respect to the reference plane. Note that a relation "θ3>0" may be satisfied. Satisfying the relation of the inclined angles "θ3<θ1<θ2" relies on the positional relation among the first light-receiving group 41, the second light-receiving group 42, and a third light-receiving group 43 of the light receiver 4 described later. However, satisfying the above relation may be mere one example but not limited thereto.

The light receiver 4 is configured to receive the reflection light C2 from the reflector 3. That is, the light receiver 4 is configured to receive the reflection light C2 to perform a photoelectric conversion on the reflection light C2. The light receiver 4 has a plurality of light-receiving elements 400. The plurality of light-receiving elements 400 may be photodiodes, for example. The light receiver 4 may be implemented as a photodiode array, for example. The light receiver 4 may be implemented as an image sensor. The light receiver 4 is mounted on the board 6 (printed board) such that respective light receiving surfaces of the light-receiving elements 400 face the reflector 3. The light receiver 4 is electrically connected to the processor 7 and is configured to output, to the processor 7, an electric signal (which may be referred to as "light-receptive signal"; e.g., a voltage signal) according to the amount of the reflection light C2 received by each light-receiving element 400.

As shown in FIG. 2, the light receiver 4 has the first light-receiving group 41, the second light-receiving group 42, and the third light-receiving group 43. In the example of FIG. 1A, the light receiver 4 is disposed to the board 6 on a rear surface (lower surface) of the board 6 that faces the reflector 3. FIG. 2 is a schematic view of the light receiver 4 seen from the upper side of the board 6 shown in FIG. 1A and the board 6 is omitted.

The first light-receiving group 41, the second light-receiving group 42, and the third light-receiving group 43 are arranged in the order of the third light-receiving group 43, the first light-receiving group 41, and the second light-receiving group 42 from the outer side to the inner side in the radial direction A2, for example.

The first light-receiving group 41 includes the plurality of first light-receiving elements 401 (light-receiving elements 400) arranged in the one direction (line direction A1) to receive the reflection light C2 reflected from the first face 31. The line direction A1 used herein may be a direction perpendicular to a straight line that passes through the detection area X1 and that is parallel to the radial direction A2 when viewed along the axial direction of the rotating plate 5, for example. In the example of FIG. 2, the first light-receiving group 41 includes seven first light-receiving elements 401 arranged in one line along the line direction A1, in accordance with the number of (i.e., seven) reflection areas 30 included within the detection area X1. To facilitate the easy understanding, in FIG. 2, areas (first irradiation areas Op1) to be irradiated with the reflection light C2 reflected from the first faces 31 are shaded with diagonal lines. In the example of FIG. 2, two first irradiation areas Op1 are present in the first light-receiving group 41 so as to correspond to positions of the two M-code areas R1 (first faces 31) each representing the first code information B1 "0" among the seven reflection areas 30 included within the detection area X1.

The second light-receiving group 42 is disposed on a side farther away from the reflector 3 than the first light-receiving group 41 is. The second light-receiving group 42 includes the plurality of second light-receiving elements 402 (light-receiving elements 400) arranged along the line direction A1 to receive the reflection light C2 reflected from the second face 32. Note that commonly designed parts may be used for the second light-receiving elements 402 and the first light-receiving elements 401, and their light receiving surfaces may have the same shapes and dimensions.

Similar to the first light-receiving group 41, the second light-receiving group 42 includes seven second light-receiving elements 402 arranged in one line along the line direction A1, in accordance with the number of (i.e., seven) reflection areas 30 included within the detection area X1. To facilitate the easy understanding, in FIG. 2, areas (second irradiation areas Op2) to be irradiated with the reflection light C2 reflected from the second faces 32 are shaded with diagonal lines. In the example of FIG. 2, two second irradiation areas Op2 are present in the second light-receiving group 42 so as to correspond to positions of the two M-code areas R1 (second faces 32) each representing the second code information B2 "1" among the seven reflection areas 30 included within the detection area X1.

In the present embodiment, the first light-receiving group 41 and the second light-receiving group 42 are arranged such that positions of the first light-receiving elements 401 and positions of the second light-receiving elements 402 are shifted from each other in the line direction A1. This "shift" is provided taking into account a "phase shift" which may be possibly generated in the light-receptive signal by a chattering noise, and may be a phase shift corresponding to a half phase (90 degrees), for example. In the embodiment, in the line direction A1, a position of the second light-receiving group 42 is shifted by a size of half of one light-receiving element 400 from a position of the first light-receiving group 41.

According to the optical encoder 1 of the present embodiment, in a normal state where no "phase shift" is generated by the chattering noise, the processor 7 reads out digital information based on the light-receptive signals obtained from the seven first light-receiving elements 401 of the first light-receiving group 41. In the example of FIG. 2, the processor 7 determines such that a first irradiation area Op1 is "0," (one area is skipped), and a non-irradiated area is "1" and as a result, reads out the digital information "0, 1, 1, 0."

On the other hand, in a case where the "phase shift" is generated by the chattering noise and the digital information cannot be read out from the light-receptive signals obtained from the first light-receiving group 41, digital information is read out based on the light-receptive signals obtained from the seven second light-receiving elements 402 of the second light-receiving group 42. In the example of FIG. 2, since no "phase shift" is generated, each of the second irradiation areas Op2 is located across two corresponding second light-receiving elements 402. If a "phase shift" is generated, digital information "0, 1, 1, 0." is read out by the processor 7 based on the positions of the second irradiation areas Op2 in the second light-receiving group 42.

The third light-receiving group 43 includes a plurality of third light-receiving elements 403 (light-receiving elements 400) arranged along the line direction A1 to receive the reflection light C2 reflected from the faces (third faces 33) of the plurality of incremental areas R2. Each third light-receiving element 403 may be an element having a light receiving surface whose shape and dimension are different from those of the light receiving surfaces of the first light-receiving element 401 and the second light-receiving element 402, for example. In the example of FIG. 2, each third light-receiving element 403 has a dimension in the line direction A1 same as that of each of the first light-receiving element 401 and the second light-receiving element 402, while has a dimension in the radial direction A2 substantially half of that of each of the first light-receiving element 401 and the second light-receiving element 402.

Moreover, the third light-receiving group 43 has two lines each of which includes seven third light-receiving elements 403 (i.e., total fourteen third light-receiving elements 403). Specifically, the third light-receiving group 43 includes a first line 43A and a second line 43B, and each of the first line 43A and the second line 43B has seven third light-receiving elements 403 arranged along the line direction A1. The first line 43A and the second line 43B are arranged at positions shifted from each other by a size of half of one third light-receiving element 403 in the line direction A1 so as to obtain analog signals of two phases (A-phase and B-phase) whose phases are shifted from each other by 90 degrees. The first line 43A is a line to obtain a A-phase (sin-phase) analog signal, and the second line 43B is a line to obtain a B-phase (cos-phase) analog signal. The processor 7 obtains the two phases (A-phase and B-phase) analog signals and calculates the rotation speed and the rotation direction of the measurement object OB1.

To facilitate the easy understanding, in FIG. 2, areas (third irradiation areas Op3) to be irradiated with the reflection light C2 reflected from the third faces 33 are shaded with diagonal lines. In the example of FIG. 2, three third irradiation areas Op3 are present in the third light-receiving group 43 so as to correspond to positions of three incremental areas R2 (third faces 33) among the seven reflection areas 30 included within the detection area X1. In the example of FIG. 2, each of the third irradiation areas Op3 is partially fit in a single corresponding third light-receiving element 403 in the first line 43A, while each of the third irradiation areas Op3 is partially fit in (across) two corresponding third light-receiving elements 403 in the second line 43B.

In the present embodiment as an example, the third light-receiving group 43 is disposed on a side closer to the reflector 3 than the first light-receiving group 41 and the second light-receiving group 42 are. In an alternative example, the third light-receiving group 43 may be disposed on a side farther away from the reflector 3 than the first light-receiving group 41 and the second light-receiving group 42 are. Further alternatively, the third light-receiving group 43 may be disposed on both of a side closer to the reflector 3 and a side farther away from the reflector 3 in a divided manner.

The processor 7 (signal processor) may be implemented as a computer system including one or more processors (microprocessors) and one or more memories. That is, the computer system performs the function of the processor 7 by making the one or more processors execute one or more programs (applications) stored in the one or more memories. In this embodiment, the program(s) is stored in advance in the memory(es) of the processor 7. However, this is only an example and should not be construed as limiting. The program(s) may also be downloaded via a telecommunications line such as the Internet or distributed after having been stored in a storage medium such as a memory card.

The processor 7 is electrically connected to the light receiver 4. The processor 7 has functions to perform a signal processing and a calculation processing regarding the electric signals (light-receptive signals) output from the light receiver 4. Specifically, the processor 7 performs an amplification processing and a digital processing on the light-receptive signals output from the first light-receiving group 41 (or the second light-receiving group 42) to calculate the absolute angular position in one rotation of the rotation shaft (measurement object OB1), for example. Moreover, the processor 7 performs an amplification processing and a digital processing on the light-receptive signals output from the third light-receiving group 43 to calculate the rotation speed and the rotation direction of the rotation shaft (measurement object OB1). The processor 7 outputs the result of the calculation to an outside (such as a control device controlling a motor).

As described above, in the normal state, the processor 7 performs the calculation processing for the absolute angular position based on the light-receptive signals obtained from the first light-receiving group 41. When the "phase shift" is generated by the chattering noise, the processor 7 determines, based on e.g., an analog signal, that which of the light-receptive signals obtained from the first light-receiving group 41 or the second light-receiving group 42 should be used, and then performs the calculation processing for the absolute angular position based on the light-receptive signals thus determined.

Moreover, the processor 7 has a function to detect an "error" due to that a light is reflected or blocked by a foreign material, which may enter the optical encoder 1. In the embodiment, the processor 7 monitors whether or not a break of a reciprocal relation occurs based on the light-receptive signals obtained from the first light-receiving group 41 and the second light-receiving group 42. Specifically, in the normal state where no foreign material is present, positions of the first irradiation areas Op1 present in the first light-receiving group 41 and positions of the second irradiation areas Op2 present in the second light-receiving group 42 have the reciprocal relation as shown in FIG. 2. Contrary, if the outgoing light C1 traveling towards the first face 31 or the reflection light C2 reflected from the first face 31 is blocked by a foreign material and no first irradiation area Op1 is present in the first light-receiving group 41 while the second irradiation area(s) Op2 is present normally in the second light-receiving group 42 for example, then the break of the reciprocal relation occurs. Moreover, if the light is reflected by a foreign material and an additional first irradiation area Op1 is present in the first light-receiving group 41 while the second irradiation area(s) Op2 is present normally in the second light-receiving group 42, then the break of the reciprocal relation occurs. When finding the occurrence of the break of the reciprocal relation, the processor 7 determines the presence of the "error" caused by the foreign material. The processor 7 outputs the result of the determination to an outside (such as a control device controlling a motor).

(2.2) Method for Production

Figure 3:
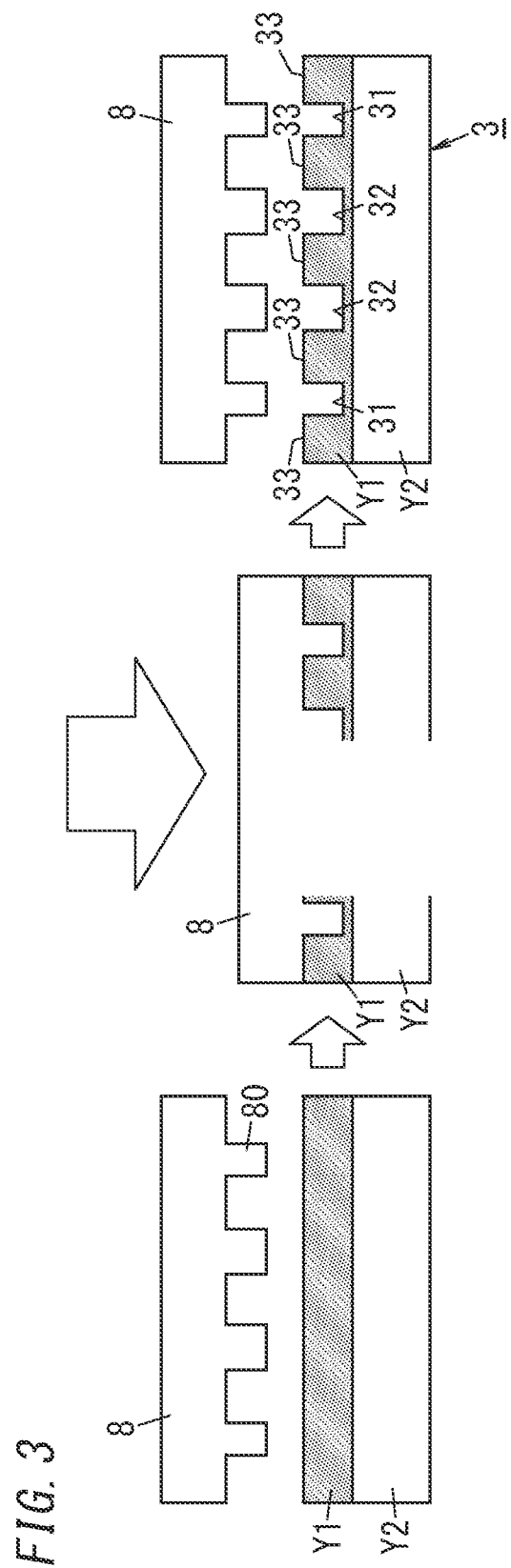
FIG. 3 is a view illustrating processes for producing the reflector of the optical encoder according to the embodiment.

A method for producing the reflector 3 having the inclination structures D1, of the optical encoder 1, will be described below with reference to FIG. 3.

The reflector 3 having the inclination structures D1 may be produced using the nanoimprint technology. For example, a resist Y1 made of UV curable resin or the like is applied onto a substrate Y2 as a base material. Then, a mold 8 (metallic mold) provided with nanometer sized fine inclination structures 80 is impressed on the resist Y1 from the above of the resist Y1 to apply pressure to the resist Y1. Subsequently, the resist Y1 is irradiated with the UV light and is cured. The mold 8 is released, and then the metal film is formed by the deposition of gold, silver, aluminum, or chromium on the surface of the resist Y1 to which the fine inclination structure is transferred. As a result, the reflector 3 is produced that has the first faces 31, the second faces 32 and the third faces 33 having inclination structures D1 different from one another. Note that FIG. 3 is a schematic front view of the reflector 3 viewed along the radial direction A2.

Advantages

Advantages of the optical encoder 1 according to the present embodiment will be described with reference to FIG. 4. According to the optical encoder 1, the reflector 3 has the plurality of reflection areas 30 that include the plurality of M-code areas R1 arranged in one line, as described above. Moreover, positions of the plurality of first light-receiving elements 401 and positions of the plurality of second light-receiving elements 402, which receive the reflection light C2, are shifted from each other in the line direction A1. This allows the optical encoder 1 to have a structure serving as the countermeasures to the phase shift of the light-receptive signal that may be generated by the chattering noise, for example. Moreover, the optical encoder 1 can contribute to increasing the amount of light reception in the light receiver 4.

FIG. 4 shows a main part of an optical encoder 1X of a comparative example, and more specifically, an enlarged view of a part of a reflector 3X of the optical encoder 1X that has a plurality of M-code areas R1X arranged in "two lines." Between the two lines of the M-code areas R1X, an incremental areas R2X are arranged in one line separately from the M-code areas R1X. In the comparative example, the M-code areas R1X of the two lines are arranged at positions shifted from each other by a half phase. Therefore, the optical encoder 1X of the comparative example also has a structure serving as the countermeasures to a phase shift that may be generated by the chattering noise.

It is supposed that, in the optical encoder 1 according to the present embodiment, each of the reflection areas 30 arranged in the one line is set to have a longitudinal length (length along the radial direction A2) substantially the same as a longitudinal length W1 shown in FIG. 4. It is further supposed that light irradiation areas onto the reflectors 3, 3X of the optical encoders 1, 1X are the same as each other. In this case, the amount of light reception is generally greater in each light-receiving element 400 of the optical encoder 1 than in each light-receiving element of the optical encoder 1X.

Specifically, in the optical encoder 1 according to the present embodiment, the incremental areas R2 are interposed in the M-code areas R1 arranged in the one line. Although this structure may possibly make the width of each of the reflection areas 30 smaller than that for the optical encoder 1X, this structure can increase the amount of light reception in the light receiver 4 with regard to the M-code areas R1 to substantially twice that for the optical encoder 1X.

Generally speaking, thinning a whole shape is easier in a reflective optical encoder than in a transmissive optical encoder. However, the reflective optical encoder may possibly have a problem of insufficient amount of light reception in a light receiver due to that a reflector should be disposed in a limited area of a rotating plate. In this regard, the abovementioned structure of the optical encoder 1 according to the present embodiment can contribute to increasing the amount of light reception in the light receiver 4. Moreover, the increase in the amount of light reception in the light receiver 4 can contribute to enhancing the resolution.

In the optical encoder 1, the plurality of reflection areas 30 further include the plurality of incremental areas R2 periodically arranged at predetermined intervals in the one line. This can contribute to increasing the amount of light reception in the light receiver 4 compared to a structure where incremental areas are arranged in different line from the plurality of M-code areas R1 such as the structure of the optical encoder 1X of the comparative example. The structure of the optical encoder 1 can increase the amount of light reception in the light receiver 4 with regard to the incremental areas R2 to substantially twice that for the optical encoder 1X.

Moreover, the third face 33 of each of the plurality of incremental areas R2 has the inclination structure D1 different from any of those of the first face 31 and the second face 32. This can increase the chance of accurately distinguishing the analog signal based on the incremental method from the digital signal (first code information B1 and second code information B2).

In the optical encoder 1 according to the present embodiment, the reflector 3 has the plurality of reflection areas 30 including the plurality of code areas R0 arranged in the one line. The light receiver 4 has the three light-receiving groups 40 respectively corresponding to and receiving light from the three kinds of reflection areas 30. This can contribute to increasing the amount of light reception in the light receiver 4 compared to a case where a plurality of code areas are provided in each of a plurality of lines (refer to the optical encoder 1X of the comparative example, for example). This can contribute to remedying the insufficiency in the amount of light reception in the light receiver 4.

(3) Variations

The embodiment described above is only one of various embodiments of the present disclosure, and may be readily modified, changed, replaced, or combined with any other embodiments, depending on a design choice or any other factor, without departing from a true spirit and scope of the present disclosure. Variations of the embodiment described above will be enumerated one after another. In the following description, the optical encoder 1 of the embodiment described above will be hereinafter sometimes referred to as a "basic example." Note that any of the variations to be described below may be combined with the basic example and\or other variations.

In the following description, the same reference signs are depicted to the components that are substantially same as those of the basic example and the explanation thereof may be appropriately omitted.

(3.1) First Variation

The first variation is described with reference to FIGS. 5A to 5C. Note that the incremental areas R2 (third faces 33) are not illustrated in FIGS. 5A to 5C for the convenience of the explanation.

Figure 5A:
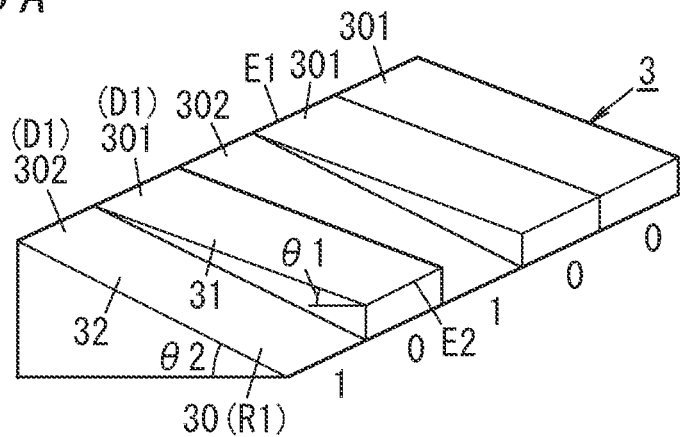
FIGS. 5A to 5C are views respectively illustrating inclination structures of reflectors of optical encoders according to a first variation of the embodiment.

For the comparison purpose, FIG. 5A schematically shows the reflector 3 of the basic example that includes the first face(s) 31 and the second face(s) 32 having inclination structures D1 different from each other. Each first face 31 has a first reflection structure 301 whose inclined angle with respect to the reference plane is set to "θ1". Each second face 32 has a second reflection structure 302 whose inclined angle with respect to the reference plane is set to "θ2". In the basic example, the inclined angles satisfy the relation "0<θ1<θ2." Moreover, the first faces 31 and the second faces 32 are inclined (upward) to be closer the light receiver 4 at the outer side in the radial direction A2 than at the center of the reflector 3.

Figure 5B:
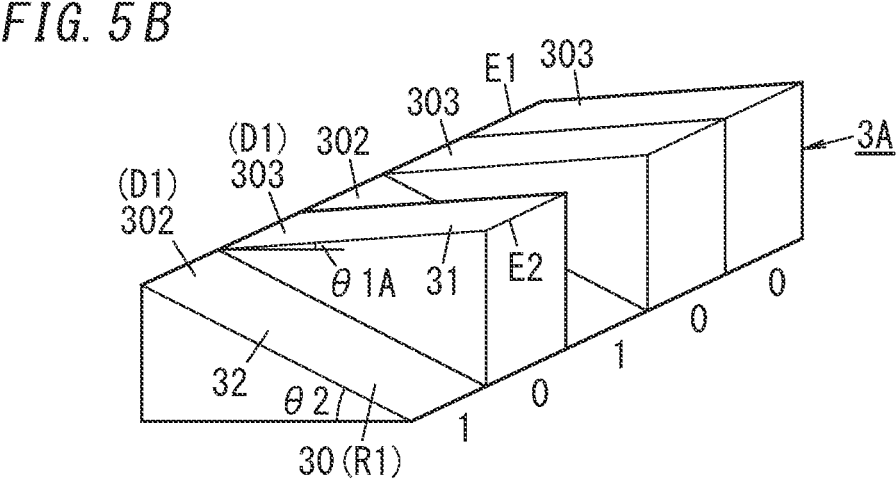

Alternatively, a first face(s) 31 and a second face(s) 32 may have inclination structures D1 different from each other as in a manner shown in FIG. 5B. FIG. 5B schematically shows the first face(s) 31 and the second face(s) 32 having inclination structures D1 different from each other according to a reflector 3A of the present variation. In the example of FIG. 5B, each second face 32 has a second reflection structure 302 whose inclined angle with respect to the reference plane is set to "θ2," similar to the basic example. On the other hand, each first face 31 has a third reflection structure 303 whose inclined angle with respect to the reference plane is set to "θ1A."

In the reflector 3A of the present variation, the inclined angles also satisfy the relation "0<θ1A<θ2." However, the first face 31 and the second face 32 have inclined directions different from each other. Each first face 31 is inclined (downward) to be farther away from the light receiver 4 at the outer side in the radial direction A2 than at the center of the reflector 3A. A height of an inner edge E2 of each first face 31 from one surface 50 of a rotating plate 5 of the present variation is greater than that for the basic example. Note that "θ1A" may be substantially 0 degree. In this case, an inclined angle θ3 of each third face 33 may preferably be set to an angle other than 0 degree. According to the reflector 3A of the present variation, a first light-receiving group 41 of a light receiver 4 may be located at a position on an outer side in the radial direction A2, compared to that for the basic example.

Figure 5C:
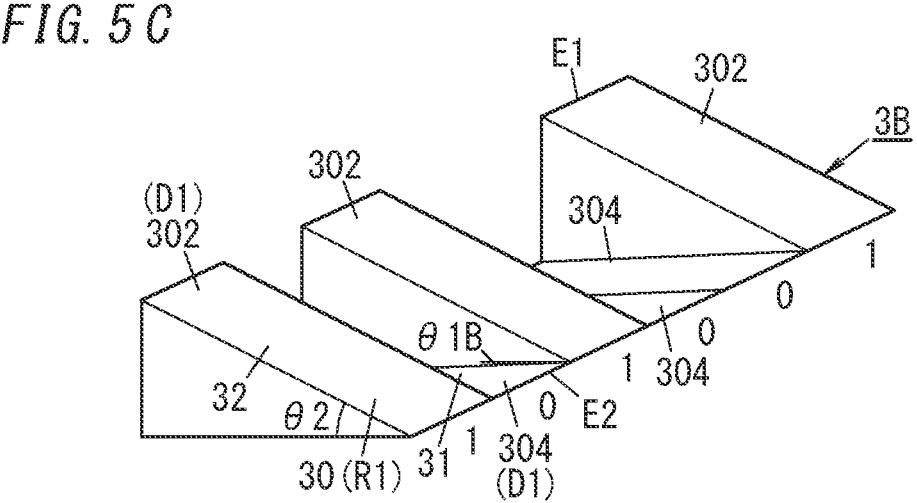

Next, FIG. 5C schematically shows a first face(s) 31 and a second face(s) 32 having inclination structures D1 different from each other according to another example (reflector 3B) of the present variation. In the example of FIG. 5C, each second face 32 has a second reflection structure 302 whose inclined angle with respect to the reference plane is set to "θ2," similar to the basic example. On the other hand, each first face 31 has a fourth reflection structure 304 whose inclined angle with respect to the reference plane is set to "θ1B."

In the reflector 3B, the inclined angles also satisfy the relation "0<θ1B<θ2." However, the first face 31 and the second face 32 have inclined directions different from each other. Each first face 31 is inclined (downward) to be farther away from the light receiver 4 at the outer side in the radial direction A2 than at the center of the reflector 3B. Moreover, an outer edge E1 of the first face 31 is positioned lower than an outer edge E1 of the second face 32 while an inner edge E2 of the first face 31 and an inner edge E2 of the second face 32 are aligned, which is a difference from the basic example. Note that "θ1B" may be substantially 0 degree. In this case, an inclined angle θ3 of each third face 33 may preferably be set to an angle other than 0 degree. According to the reflector 3B of the present variation, a first light-receiving group 41 of a light receiver 4 may be located at a position on an outer side in the radial direction A2, compared to that for the basic example.

(3.2) Second Variation

The second variation is described with reference to FIG. 6.

FIG. 6 schematically shows a reflector 3C and a light receiver 4C of the present variation. The reflector 3C has a plurality of reflection areas 30 including a plurality of M-code areas R1 and incremental areas R2 arranged in one line. The light receiver 4C has three light-receiving groups 40 (first to third light-receiving groups 41 to 43) respectively corresponding to and receiving light from first to third faces 31 to 33 of the reflector 3C (i.e., three (gradation) levels scheme using three light-receiving groups 40, as with the basic example). In FIG. 6, different inclined angles of the plurality of reflection areas 30 are shown by different densities of the dots. In the figure, the reflection areas 30 having the same densities of the dots have the same inclined angle.

The present variation is different from the basic example in that the incremental areas R2 of the reflector 3C are periodically arranged such that an incremental area R2 is disposed per two M-code areas R1 (in the basic example, per one M-code area R1). Note that FIG. 6 shows an example of a detection area X1 corresponding to 5-bits, as an example. In the example of FIG. 6, seven reflection areas 30 are present in the detection area X1, and five of them correspond to the M-code areas R1. In the example of FIG. 6, a signal representing the information "0, 0, 1, 1, 0" is output by the light receiver 4C side.

The present variation is further different from the basic example in that no positional shift in the line direction A1 is present between the first light-receiving group 41 and the second light-receiving group 42 in the light receiver 4C. That is, the optical encoder 1 of the present variation does not have a structure as the countermeasures to a phase shift that may be generated by the chattering noise. Note that the present variation also can detect "error" due to a light reflection or light-blocking caused by a foreign material as with the basic example, because the first face 31 and the second face 32 have different inclination structures D1 and the light receiver 4C has the first light-receiving group 41 and the second light-receiving group 42.

Moreover, in the present variation, the third light-receiving group 43 of the light receiver 4C is arranged in only one line, which is a further difference from the basic example that has the first line 43A and the second line 43B to obtain the analog signals of two phases.

The present variation is further different from the basic example in that, in the light receiver 4C, the third light-receiving group 43 is disposed on a side farther away from the reflector 3 than the first light-receiving group 41 and the second light-receiving group 42 are. According to the present variation, the reflector 3C may be configured such that inclined angles of the first face 31 to the third face 33 with respect to the reference plane may satisfy a relation "θ1<θ2<θ3," for example.

The present variation also can contribute to increasing the amount of light reception in the light receiver 4C compared to a case where a plurality of code areas are provided in each of a plurality of lines (refer to the optical encoder 1X of the comparative example, for example). This can contribute to remedying the insufficiency in the amount of light reception in the light receiver 4C.

(3.3) Third Variation

The third variation is described with reference to FIG. 7.

Figure 7:
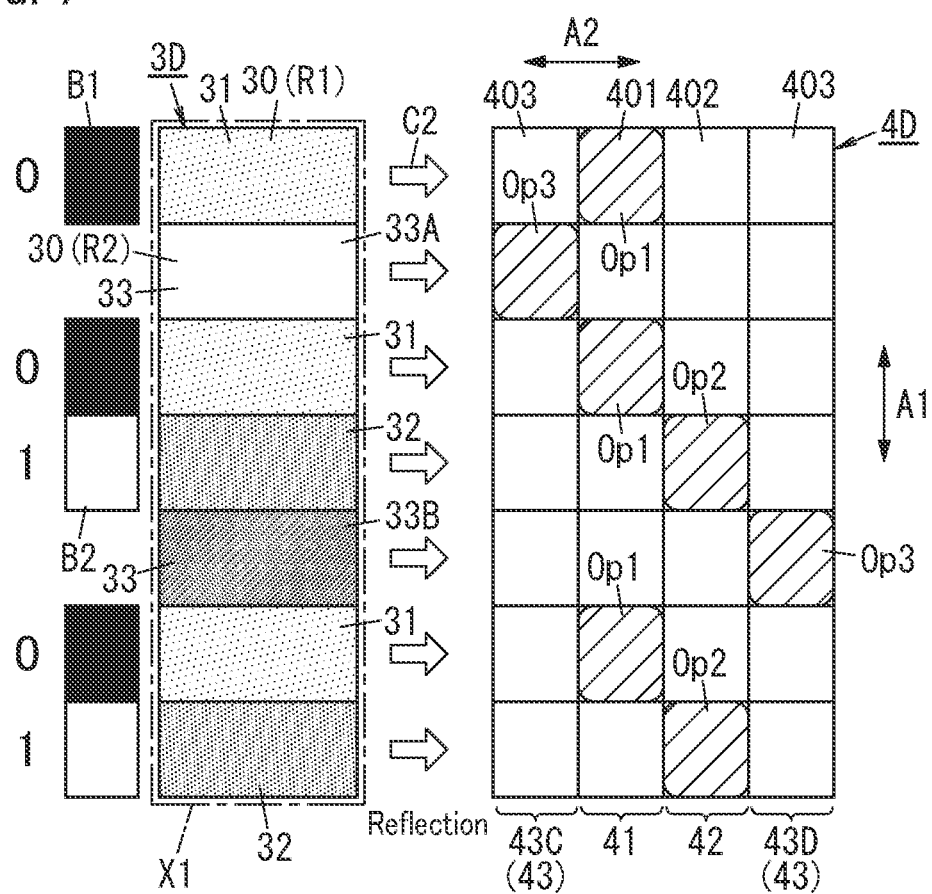
FIG. 7 is a view illustrating a positional relationship between a reflector and a light receiver of an optical encoder according to a third variation of the embodiment.

FIG. 7 schematically shows a reflector 3D and a light receiver 4D of the present variation. The reflector 3D has a plurality of reflection areas 30 including a plurality of M-code areas R1 and incremental areas R2 arranged in one line. The present variation is different from the basic example in that the reflector 3D includes two kinds of third faces 33 (third face 33A and third face 33B). In FIG. 7, different inclined angles of the plurality of reflection areas 30 are shown by different densities of the dots. In the figure, the reflection areas 30 having the same densities of the dots have the same inclined angle.

The light receiver 4D has four light-receiving groups 40 respectively corresponding to and receiving light from a first face(s) 31, a second face(s) 32, the third face 33A, and the third face 33B of the reflector 3D (four (gradation) levels scheme).

The reflector 3D of the present variation is substantially the same as that of the second variation except the third face 33A and the third face 33B. Descriptions for the substantially same structures are thus omitted. The third face 33A and the third face 33B have inclination structures D1 different from each other. For example, the reflector 3D is configured such that inclined angles satisfy a relation "θ3A<θ1<θ2<θ3B," where "θ3A" denotes an inclined angle of the third face 33A with respect to the reference plane, and "θ3B" denotes an inclined angle of the third face 33B with respect to the reference plane.

In the present variation, the light receiver 4D has a first light-receiving group 41, a second light-receiving group 42, and two third light-receiving groups 43 (43C, 43D). The two third light-receiving groups 43C, 43D are separately disposed on: a side closer to the reflector 3D than the first light-receiving group 41 and the second light-receiving group 42 are; and a side farther away from the reflector 3D than the first light-receiving group 41 and the second light-receiving group 42 are. The reflection light C2 reflected from the third face 33A is received by the third light-receiving group 43C. The reflection light C2 reflected from the third face 33B is received by the third light-receiving group 43D.

The third light-receiving group 43C is a light-receiving group provided for an "even number on both sides." If the sum of pieces of code information of M-code areas R1 present on both sides of an incremental area R2 is an even number, then the third face 33A is set with respect to this incremental area R2, for example. The third light-receiving group 43C is a light-receiving group for receiving the reflection light C2 from the third face 33A set in this manner. In the example of FIG. 7, focusing on an upper incremental area R2, pieces of code information of both sides of this upper incremental area R2 is "0, 0" and thus the sum of them is 0 (=0+0), an even number. Therefore, the third face 33A is set with respect to this upper incremental area R2.

On the other hand, the third light-receiving group 43D is a light-receiving group provided for an "odd number on both sides." If the sum of pieces of code information of M-code areas R1 present on both sides of an incremental area R2 is an odd number, then the third face 33B is set with respect to this incremental area R2, for example. The third light-receiving group 43D is a light-receiving group for receiving the reflection light C2 from the third face 33B set in this manner. In the example of FIG. 7, focusing on a lower incremental area R2, pieces of code information of both sides of this lower incremental area R2 is "1, 0" and thus the sum of them is 1 (=1+0), an odd number. Therefore, the third face 33B is set with respect to this lower incremental area R2.

The present variation (four (gradation) levels scheme) also can contribute to increasing the amount of light reception in the light receiver 4D. This can contribute to remedying the insufficiency in the amount of light reception in the light receiver 4D.

Particularly, in the present variation, the third face 33A and the third face 33B having different inclination structures D1 are provided. Moreover, the third light-receiving group 43 has the light-receiving group provided for the "even number on both sides" and the light-receiving group provided for the "odd number on both sides." This allows the processor 7 to detect an "error code" caused by an unintended reflection or blocking of light by a foreign material entered, based on the light-receptive signals from the "even number on both sides" light-receiving group and the "odd number on both sides" light-receiving group.

It is assumed a case where a ray of light is radiated to a third light-receiving element 403 of the "even number on both sides" in the third light-receiving group 43C. If information of "0, 1" is detected from light-receptive signals supplied from two first light-receiving elements 401 disposed on both sides in the line direction A1 of one first light-receiving element 401 adjacent to this third light-receiving element 403 receiving the ray of light, the processor 7 determines the presence of "error" caused by a foreign material. In short, the present variation has a parity check-like function.

As described above, the third light-receiving group 43 of the present variation includes two light-receiving groups 43C, 43D for parity check. The two light-receiving groups 43C, 43D are disposed on: a side closer to the reflector 3D than the first light-receiving group 41 and the second light-receiving group 42 are; and a side farther away from the reflector 3D than the first light-receiving group 41 and the second light-receiving group 42 are, respectively.

The processor 7 outputs the result of the determination to an outside (such as a control device controlling a motor). By using this determination in combination with the determination about the break of the reciprocal relation based on the light-receptive signals obtained from the first light-receiving group 41 and the second light-receiving group 42 described in the basic example, the "error" caused by the foreign material can be detected more accurately.

(3.4) Fourth Variation

The fourth variation is described with reference to FIG. 8.

Figure 8:
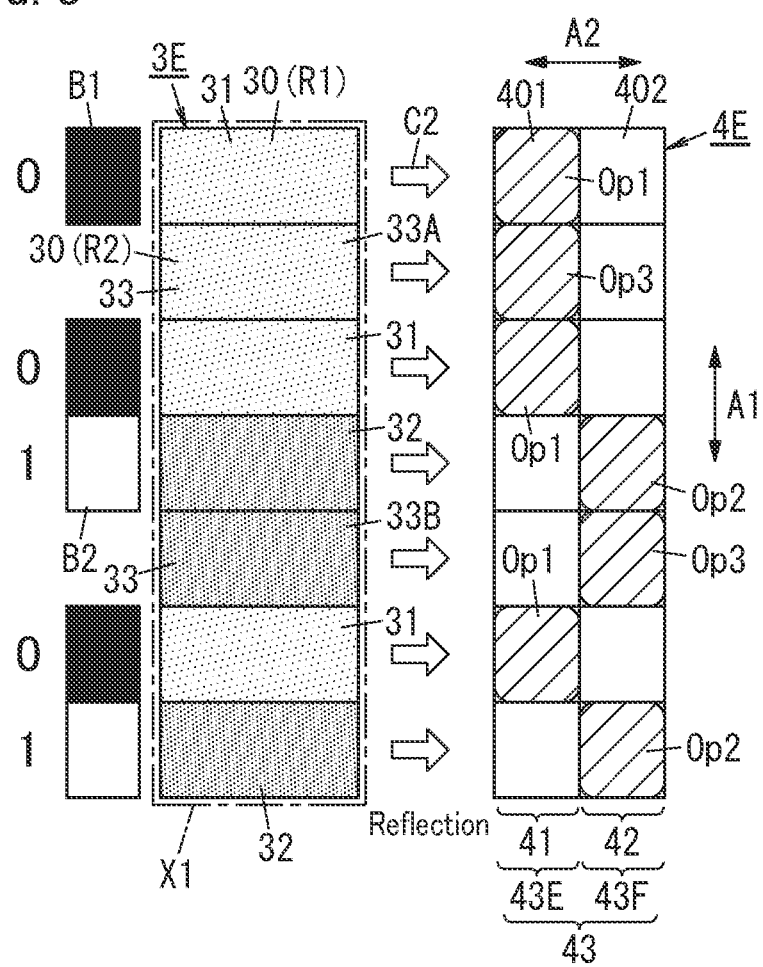
FIG. 8 is a view illustrating a positional relationship between a reflector and a light receiver of an optical encoder according to a fourth variation of the embodiment.

FIG. 8 schematically shows a reflector 3E and a light receiver 4E of the present variation. The reflector 3E has a plurality of reflection areas 30 including a plurality of M-code areas R1 and incremental areas R2 arranged in one line. Like the third variation, the present variation is different from the basic example in that the reflector 3E includes two kinds of third faces 33 (third face 33A and third face 33B). In FIG. 8, different inclined angles of the plurality of reflection areas 30 are shown by different densities of the dots. In the figure, the reflection areas 30 having the same densities of the dots have the same inclined angle.

The light receiver 4E of the present variation has a first light-receiving group 41 and a second light-receiving group 42 respectively corresponding to and receiving light from a first face(s) 31 and a second face(s) 32 of the reflector 3E. Note that the present variation is further different from the basic example in that the first light-receiving group 41 and the second light-receiving group 42 of the light receiver 4E further receive the reflection light C2 from the third face 33A and the third face 33B (two (gradation) levels scheme).

Like the third variation, the light receiver 4E of the present variation has two third light-receiving groups 43 (43E, 43F). However, the first light-receiving group 41 and the third light-receiving group 43E are common to each other. Moreover, the second light-receiving group 42 and the third light-receiving group 43F are common to each other. The third light-receiving group 43E is a light-receiving group provided for an "even number on both sides." The third light-receiving group 43F is a light-receiving group provided for an "odd number on both sides."

Like the third variation, the third face 33A is set with respect to an incremental area R2, whose sum of pieces of code information of M-code areas R1 present on both sides of the incremental area R2 is an even number. Like the third variation, the third face 33B is set with respect to an incremental area R2, whose sum of pieces of code information of M-code areas R1 present on both sides of the incremental area R2 is an odd number.

In the present variation, an inclined angle of the third face 33A with respect to the reference plane, denoted by "θ3A," is set to be the same as an inclined angle "θ1" of each first face 31 (i.e., θ3A=θ1). As a result, the reflection light C2 from the third face 33A is received by the first light-receiving group 41 (third light-receiving group 43E), which is the same as that for the first face 31.

Moreover, in the present variation, an inclined angle of the third face 33B with respect to the reference plane, denoted by "θ3B," is set to be the same as an inclined angle "θ2" of each second face 32 (i.e., θ3B=θ2). As a result, the reflection light C2 from the third face 33B is received by the second light-receiving group 42 (third light-receiving group 43F), which is the same as that for the second face 32.

In short, in the present variation, a plurality of incremental areas R2 have: a first incremental area of which face (third face 33A) has an inclination structure same as that of the first face 31; and a second incremental area of which face (third face 33B) has an inclination structure same as that of the second face 32. The first light-receiving group 41 is disposed to receive the reflection light C2 reflected from the first incremental area (third face 33A). The second light-receiving group 42 is disposed to receive the reflection light C2 reflected from the second incremental area (third face 33B).

Similar to the third variation, the present variation has a function for the parity check. Furthermore, the present variation has the advantages over the third variation in contributing to simplifying the structure of the light receiver 4E and downsizing. Moreover, the reflector 3E can contribute to reducing the number of types of inclined angles (density patterns of the dots shown in FIG. 8 are only "two types"), which contributes to simplifying the production.

(3.5) Fifth Variation

The fifth variation is described with reference to FIG. 9.

Figure 9:
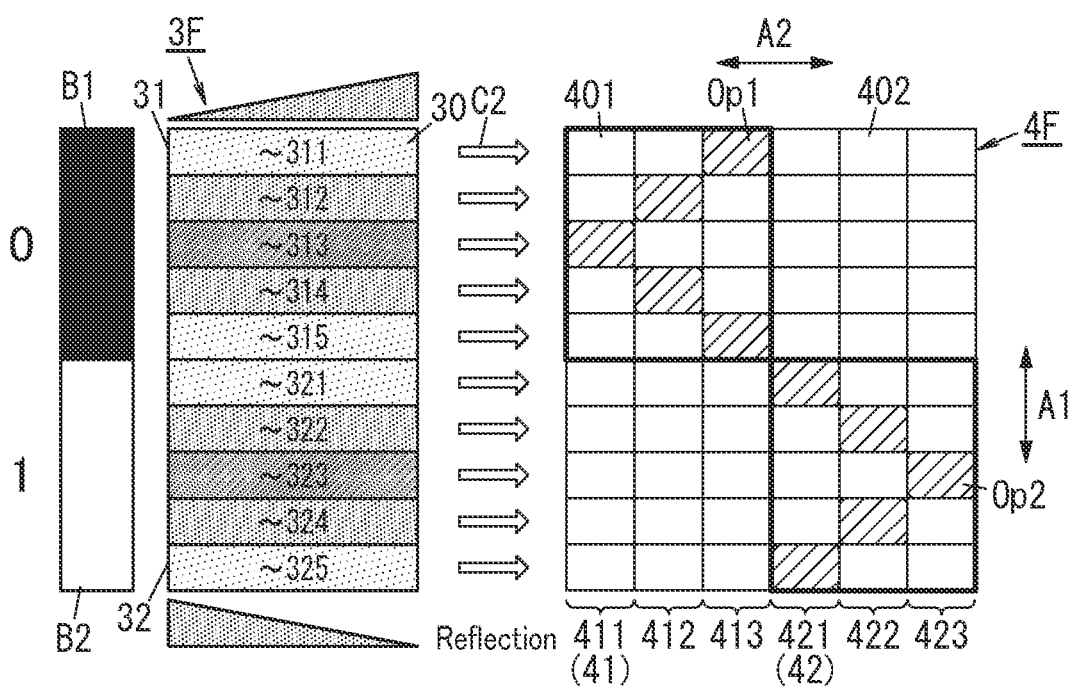
FIG. 9 is a view illustrating a positional relationship between a reflector and a light receiver of an optical encoder according to a fifth variation of the embodiment.

FIG. 9 schematically shows a reflector 3F and a light receiver 4F of the present variation. The reflector 3F has a plurality of reflection areas 30 including a plurality of M-code areas R1 arranged in one line. Although the description of the present variation is given focusing on two M-code areas R1 representing pieces of information "0" and "1" included in the reflection areas 30, the plurality of reflection areas 30 may further include incremental areas R2.

In the basic example, each of the first face 31 and the second face 32 respectively corresponding to pieces of code information "0" and "1" is a flat surface having an inclination structure D1 configured by one kind of inclined surface. In the present variation, each of the first face 31 and the second face 32 is configured by two or more kinds (in the example of FIG. 9, three kinds) of inclined surfaces (multistage inclination scheme). In FIG. 9, different inclined angles of the plurality of reflection areas 30 are shown by different densities of the dots. In the figure, the reflection areas 30 having the same densities of the dots have the same inclined angle. It should be note that an inclined direction in the first face 31 and an inclined direction in the second face 32 are different from each other.

The first face 31 is configured by five inclined surfaces 311 to 315 arranged in this order from the top. The inclined surface 311 and the inclined surface 315 have the same inclined angles as each other. The inclined surface 312 and the inclined surface 314 have the same inclined angles as each other. The inclined surface 313 may be a surface substantially parallel to the reference plane, for example. Each of the inclined surfaces 311, 312, 314, and 315 is inclined (downward) to be farther away from the light receiver 4F at the outer side in the radial direction A2 than at the center of the reflector 3F.

Inclined angles of the inclined surfaces 311 to 315 may be set to satisfy a relation "0~θ13<θ12<θ11," where "θ11" denotes an inclined angle of each of the inclined surfaces 311 and 315, "θ12" denotes an inclined angle of each of the inclined surfaces 312 and 314, and "θ13" denotes an inclined angle of the inclined surface 313.

The second face 32 is configured by five inclined surfaces 321 to 325 arranged in this order from the top. The inclined surface 321 and the inclined surface 325 have the same inclined angles as each other. The inclined surface 322 and the inclined surface 324 have the same inclined angles as each other. Each of the inclined surfaces 321 to 325 is inclined (upward) to be closer the light receiver 4F at the outer side in the radial direction A2 than at the center of the reflector 3F.

Inclined angles of the inclined surfaces 321 to 325 may be set to satisfy a relation "θ11<θ21<θ22<θ23," where "θ21" denotes an inclined angle of each of the inclined surfaces 321 and 325, "θ22" denotes an inclined angle of each of the inclined surfaces 322 and 324, and "θ23" denotes an inclined angle of the inclined surface 323.

In the present variation, the light receiver 4F has total six light-receiving groups 40. Three of the six light-receiving groups 40 are first light-receiving groups 41 (411 to 413), and remaining three of them are second light-receiving groups 42 (421 to 423).

The multistage inclination scheme is employed in the reflector 3F where each of the first face 31 and the second face 32 is configured by multiple kinds of inclined surfaces. As a result, the light receiver 4F outputs light-receptive signals where each of pieces of code information "0" and "1" is gradated in a form continuously changed like an analog signal, as shown in FIG. 9.

The present variation also can contribute to increasing the amount of light reception in the light receiver 4F compared to a case where a plurality of code areas are provided in each of a plurality of lines (refer to the optical encoder 1X of the comparative example, for example). This can contribute to remedying the insufficiency in the amount of light reception in the light receiver 4F.

In the present variation, the multistage inclination scheme is employed in the reflector 3F where each of the first face 31 and the second face 32 is configured by multiple kinds of inclined surfaces. This allows the present variation to be used not only for the M-code but also for the Gray code.

By employing the multistage inclination as in the present variation, much more information can be obtained from one array (realizing data compression with a higher compression ratio). It will be supposed the following M-code array of 9-bits, for example.

TABLE 1

| 0 | 0 | 1 | 0 | 1 | 1 | 0 | 1 | 0 |
| --- | --- | --- | --- | --- | --- | --- | --- | --- |

With regard to this M-code array of 9-bits, the faces may be inclined in multistage such that each inclination represents a piece of information of 3-bits. Specifically, one kind of inclined surface is prepared for a piece of information of the first 3-bits "001"="1 (in decimal number)." Another kind of inclined surface is prepared for a piece of information of the next 3-bits "011"="3 (in decimal number)." Yet another kind of inclined surface is prepared for a piece of information of the further next 3-bits "010"="2 (in decimal number)." . . . In this manner, the multistage inclination can contribute to compressing the data. In bit arrays each of which is obtained by uniting 3-bits of the 9-bits, adjacent bit arrays are different from each other in arrayed bit pattern. That is, when the rotating plate 5 rotates, the detection area moves over the arrays in the order of "1 (in decimal number)," "3 (in decimal number)," and "2 (in decimal number)," which are different from each other. This can generate a pattern similar to the M-code. In summary, the plurality of code areas R0 have inclination structures D1 different form each other. The inclination structures D1 respectively correspond to bit arrays. Each of the bit arrays is configured by m-bits, where "m" is a natural number smaller than "n". Adjacent bit arrays of the bit arrays are different from each other in arrayed bit pattern. In the above example, n=9 and m=3.

Figure 10:
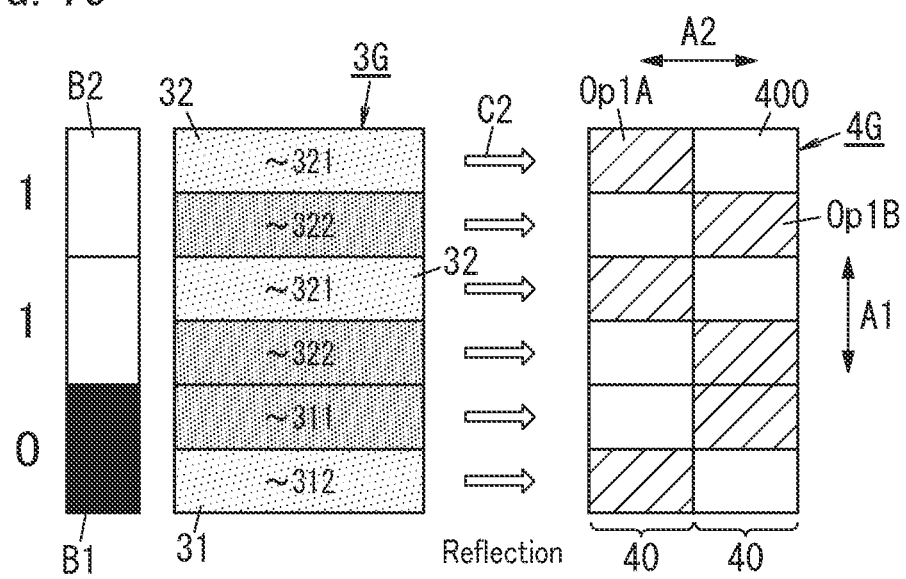
FIG. 10 is a view illustrating a positional relationship between a reflector and a light receiver of an optical encoder according to another application of the fifth variation of the embodiment.

Moreover, in an applicational example of the present variation, the optical encoder 1 may be applied to the Manchester encoding (refer to a reflector 3G and a light receiver 4G of FIG. 10). In the example of FIG. 10, a first face 31 corresponding to a piece of code information "0" has two kinds of inclined surfaces 311 and 312 from the top. Moreover, a second face 32 corresponding to a piece of code information "1" has two kinds of inclined surfaces 321 and 322 from the top. It should be noted that an inclined angle and an inclined direction of the inclined surface 311 of the first face 31 is same as those of the inclined surface 322 of the second face 32. Moreover, an inclined angle and an inclined direction of the inclined surface 312 of the first face 31 is same as those of the inclined surface 321 of the second face 32. In the light receiver 4G, a light-receiving group 40 in a left line is referred to as "low" group, and a light-receiving group 40 in a right line is referred to as "high" group. This structure can provide such a light-receptive signal that represents a piece of information "0" by a falling (from "high" to "low") and represents a piece of information "1" by a rising (from "low" to "high") (refer to irradiation areas Op1A and Op1B of FIG. 10).

Figure 11:
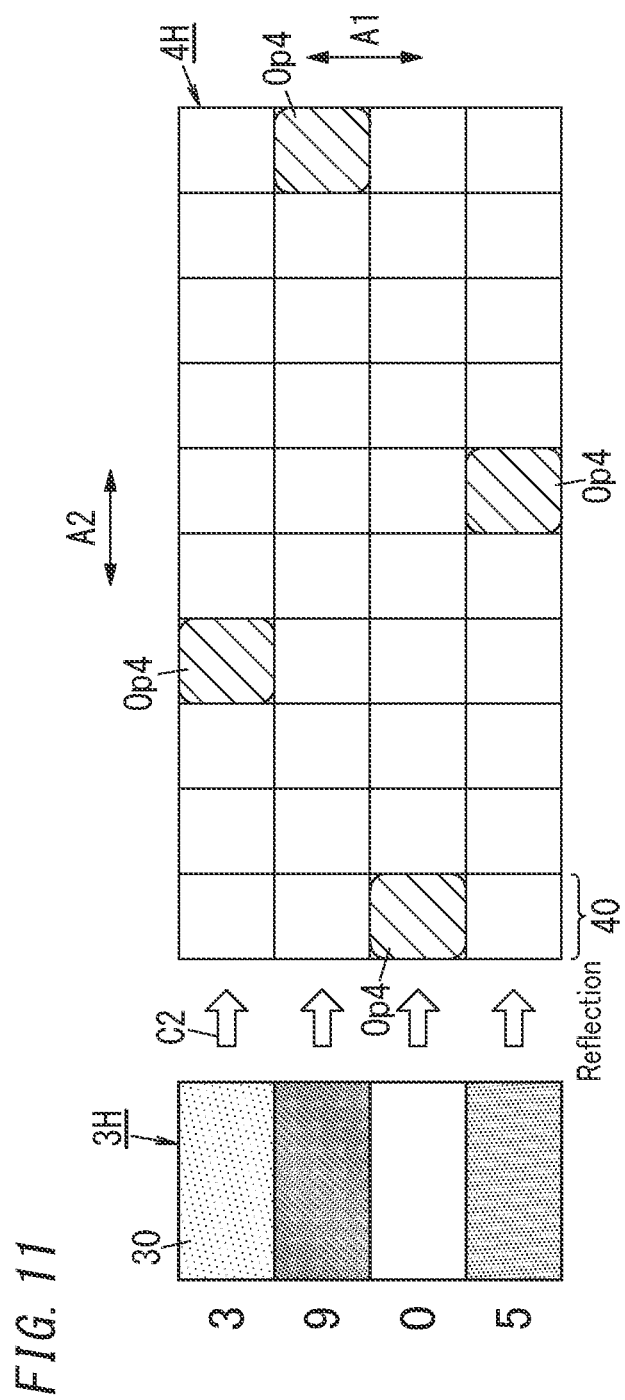
FIG. 11 is a view illustrating a positional relationship between a reflector and a light receiver of an optical encoder according to yet another application of the fifth variation of the embodiment.

In a further applicational example of the present variation, the optical encoder 1 may be applied to the decimal system by preparing 10 kinds of inclinations, for example (refer to a reflector 3H and a light receiver 4H of FIG. 11). In the example of FIG. 11, the reflector 3H has reflection areas 30 each of which has one of 10-stages inclined surface (in the example of FIG. 11, only four types of inclined surfaces respectively corresponding to "3," "9," "0," and "5" are shown). The light receiver 4H has 10-lines of light-receiving groups 40 arranged in the radial direction A2. In the light receiver 4H of this example, rays of the reflection lights C2 from the inclined surfaces of the reflection areas 30 respectively corresponding to "3," "9," "0," and "5" are radiated to respective irradiation areas Op4 of corresponding lines of the light receiving groups 40.

(3.6) Six Variation

The sixth variation is described with reference to FIGS. 14 and 15.

Figure 14:
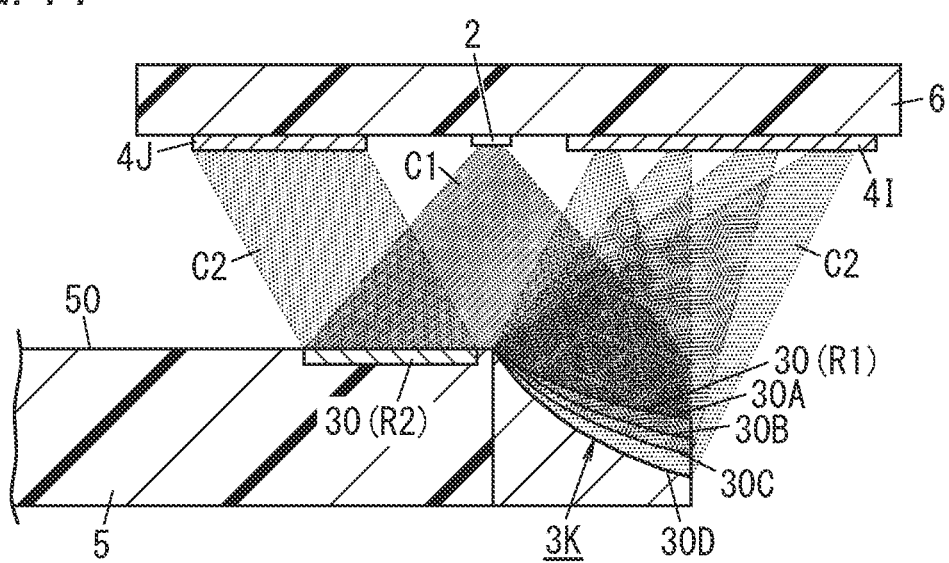
FIG. 14 is a schematic sectional view of a main part of an optical encoder according to a sixth variation of the embodiment.
Figure 15:
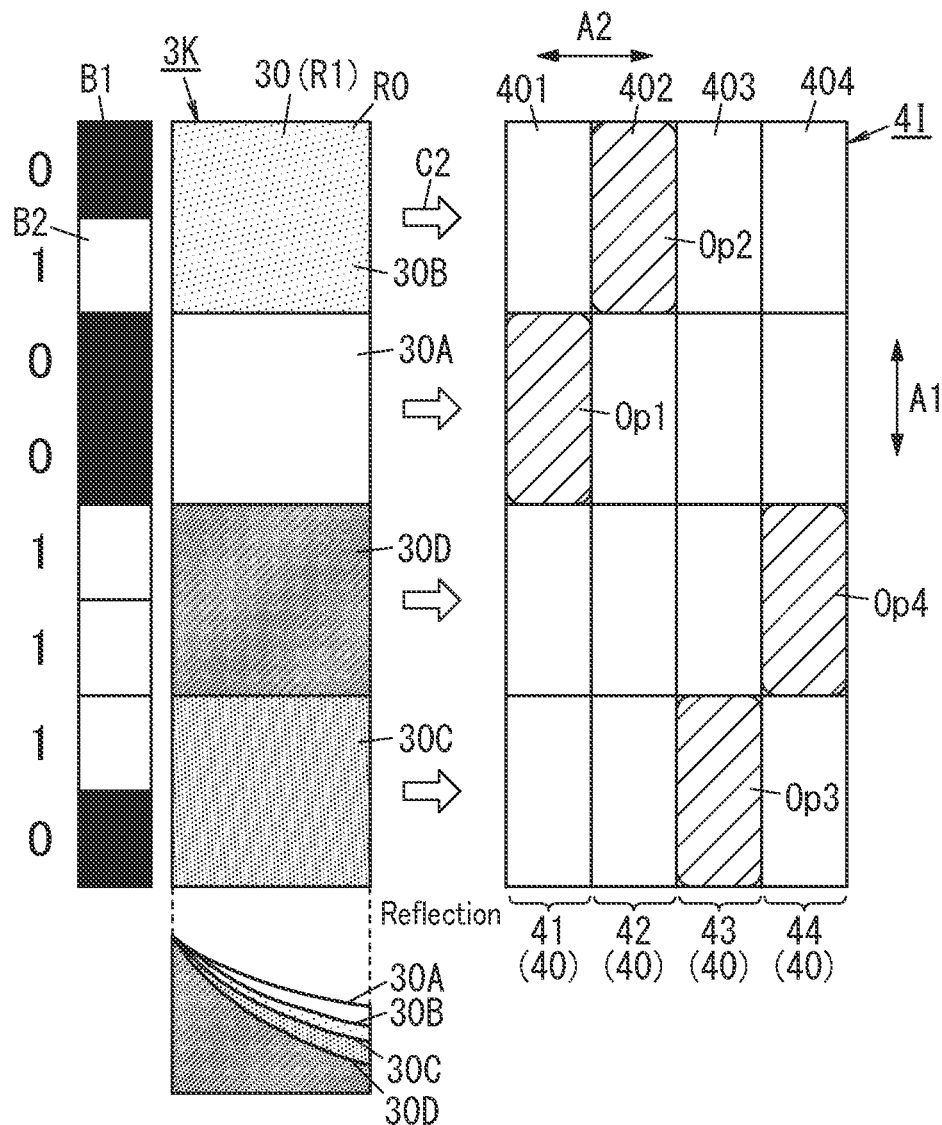
FIG. 15 is a view illustrating a positional relationship between a reflector and a light receiver of the optical encoder according to the sixth variation of the embodiment.

FIG. 14 is a schematic sectional view of a main part of an optical encoder 1 of the present variation. FIG. 15 is a view illustrating a positional relationship between a reflector 3K and a light receiver (first light receiver 4I) included in the optical encoder 1. In the optical encoder 1 of the present variation, a plurality of reflection areas 30 of the reflector 3K include a plurality of code areas R0 (M-code areas R1) arranged in one line, as shown in FIG. 15. Moreover, the plurality of reflection areas 30 of the reflector 3K further include a plurality of incremental areas R2 (refer to FIG. 14). Note that in FIG. 15, the incremental areas R2 are omitted to be illustrated.

A rotating plate 5 is formed in a disc shape. FIG. 14 shows a sectional view around a peripheral region of the rotating plate 5 cut along a center axis of the rotating plate 5. The plurality of M-code areas R1 (code areas R0) are arranged on the peripheral region of the rotating plate 5 along the circumference of the rotating plate 5. The plurality of incremental areas R2 are arranged on an inner side (closer to the center axis of the rotating plate 5) than the plurality of M-code areas R1. The plurality of incremental areas R2 are arranged adjacent to the plurality of M-code areas R1 and along the circumference of the rotating plate 5. In short, when one surface 50 (upper surface) of the rotating plate 5 is viewed from the upper side, the plurality of M-code areas R1 are arranged along the periphery of the rotating plate 5 as in a ring shape, and the plurality of incremental areas R2 are arranged in a ring shape on an inner side than the plurality of M-code areas R1 such that the plurality of M-code areas R1 and the plurality of incremental areas R2 are concentric.

That is, in the present variation, the incremental areas R2 are arranged in another line different from one line in which the plurality of M-code areas R1 are arranged. In other words, the plurality of reflection areas 30 further include the plurality of incremental areas R2 corresponding to an incremental track. The plurality of incremental areas R2 are periodically arranged at predetermined intervals in another line which is different from the one line for the plurality of code areas R0 (M-code areas R1).

In the present variation, the plurality of incremental areas R2 have faces, each of which has a level structure without inclined with respect to the reference plane, as shown in FIG. 14. In the example of FIG. 14, each of the faces of the plurality of incremental areas R2 is substantially flush with the one surface 50 (upper surface) of the rotating plate 5.

As shown in FIG. 14, in the present variation, the optical encoder 1 includes, as a light receiver for receiving the reflection light C2, a first light receiver 4I for receiving the reflection light C2 reflected from the M-code areas R1 and a second light receiver 4J for receiving the reflection light C2 reflected from the incremental areas R2.

In the present variation, the plurality of M-code areas R1 include four kinds of inclined surfaces (reflection surface), i.e., a first inclined surface 30A, a second inclined surface 30B, a third inclined surface 30C, and a fourth inclined surface 30D. The first to fourth inclined surfaces 30A to 30D have inclined angles different from one another, as shown in FIGS. 14 and 15. Each of the first to fourth inclined surfaces 30A to 30D has a curved inclination structure gently recessed below the one surface 50 (upper surface) of the rotating plate 5. In FIG. 15, the differences in the inclined angles of the first to fourth inclined surfaces 30A to 30D are shown by the differences in the densities of the dots.

The inclined angles are set to satisfy a relation "θ31<θ32<θ33<θ34," where "θ31," "θ32," "θ33," and "θ34" denotes included angles of the first to fourth inclined surfaces 30A to 30D with respect to the reference plane, respectively, for example. The inclined angle of each of the first to fourth inclined surfaces 30A to 30D may be defined as an inclined angle of a line segment connecting both ends of the inclined curved surface, for example. The first to fourth inclined surfaces 30A to 30D have curvature radii that allow the reflection light C2 to be concentrated on the first light receiver 4I (refer to irradiation areas Op1, Op2, Op3, Op4 of FIG. 15).

In FIG. 14, for the convenience of the illustration of the reflection light C2, the first inclined surface 30A, the second inclined surface 30B, the third inclined surface 30C, and the fourth inclined surface 30D are arranged in this order from the back to the front in the figure. It should be noted that this order is different from the order shown in FIG. 15 (in FIG. 15, they are arranged in an order of the second inclined surface 30B, the first inclined surface 30A, the fourth inclined surface 30D, and the third inclined surface 30C from the top).

In the present variation, the first to fourth inclined surfaces 30A to 30D have four inclination structures D1 according to the number of tones of the M-code array compressed in four (gradation) levels. Specifically, a piece of information "00 (in M-code array)"="0 (in quaternary representation)" is associated with the first inclined surface 30A having the inclined angle "θ31," for example. Similarly, another piece of information "01 (in M-code array)"="1 (in quaternary representation)" is associated with the second inclined surface 30B having the inclined angle "θ32." Yet another piece of information "10 (in M-code array)"="2 (in quaternary representation)" is associated with the third inclined surface 30C having the inclined angle "θ33." Further yet another piece of information "11 (in M-code array)"="3 (in quaternary representation)" is associated with the fourth inclined surface 30D having the inclined angle "θ34."

In short, the reflector 3K has three or more kinds (four kinds, in the present variation) of reflection areas having inclination structures different from one another.

Accordingly, one inclination structure includes a piece of information corresponding to compressed two pieces of data of the M-code array. This can obtain the absolute position information by the same resolution as that of the optical encoder 1X (refer to FIG. 4) of the comparative example with a smaller area to be irradiated with the reflection light C2. Moreover, the curvature (radius) of each of the first to fourth inclined surfaces 30A to 30D can concentrate the light, which improve the light use efficiency.

The first light receiver 4I will be described in detail. As shown in FIG. 15, the first light receiver 4I has four light-receiving groups 40 (a first light-receiving group 41, a second light-receiving group 42, a third light-receiving group 43, and a fourth light-receiving group 44) respectively corresponding to and receiving light from the first to fourth inclined surfaces 30A to 30D of the reflector 3K. The four light-receiving groups 40 are arranged along the radial direction A2.

The second light receiver 4J has a light-receiving group including a plurality of light-receiving elements configured to receive the reflection light C2 reflected from the incremental areas R2, but detailed explanations thereof are omitted.

In the present variation, the first light receiver 4I and the second light receiver 4J are mounted on the board 6 on which the light source 2 is mounted. More particularly, in the present variation, the first light receiver 4I and the second light receiver 4J are mounted on one surface (lower surface in FIG. 14) of the same board 6 in an order of the second light receiver 4J, the light source 2, and the first light receiver 4I from the center axis toward the outer side of the rotating plate 5. As shown in FIG. 14, the light source 2 is mounted on the board 6 at a position substantially facing a boundary region between the M-code areas R1 and the incremental areas R2.

The first light-receiving group 41 includes a plurality of (four, in the variation) first light-receiving elements 401 arranged in one direction (line direction A1) to receive the reflection light C2 reflected from the first inclined surface 30A.

The second light-receiving group 42 is disposed on a side farther away from the reflector 3K than the first light-receiving group 41 is. The second light-receiving group 42 includes a plurality of (four, in the variation) second light-receiving elements 402 arranged along the line direction A1 to receive the reflection light C2 reflected from the second inclined surface 30B.

The third light-receiving group 43 is disposed on a side farther away from the reflector 3K than the second light-receiving group 42 is. The third light-receiving group 43 includes a plurality of (four, in the variation) third light-receiving elements 403 arranged along the line direction A1 to receive the reflection light C2 reflected from the third inclined surface 30C.

The fourth light-receiving group 44 is disposed on a side farther away from the reflector 3K than the third light-receiving group 43 is. The fourth light-receiving group 44 includes a plurality of (four, in the variation) fourth light-receiving elements 404 arranged along the line direction A1 to receive the reflection light C2 reflected from the fourth inclined surface 30D.

In short, the light receiver (first light receiver 4I) has three or more (four, in the present variation) light-receiving groups respectively corresponding to and receiving light from the three or more kinds (four kinds, in the present variation) of reflection areas of the reflector 3K.

In the present variation, the reflection light C2 reflected from each of the first to fourth inclined surfaces 30A to 30D is to be concentrated on any one light-receiving element of the first to fourth light-receiving elements 401 to 404 that are arranged in the same column along the radial direction A2. That is, from the four light-receiving elements, i.e., the first to fourth light-receiving elements 401 to 404 arranged in the same column along the radial direction A2, any one of pieces of information "1,0,0,0," "0,1,0,0," "0,0,1,0," and "0,0,0,1" is to be detected. In the example of FIG. 15, focusing on the first to fourth light-receiving elements 401 to 404 arranged in the topmost column, the reflection light C2 is received by only the second light-receiving element 402 (refer to the irradiation area Op2), and a piece of information "0,1,0,0" is detected from the light-receptive signals of these first to fourth light-receiving elements 401 to 404.

If a piece of information "0,0,0,0" is detected from the light-receptive signals of the first to fourth light-receiving elements 401 to 404 arranged in the radial direction A2 and located in the same column, for example, due to that the light is blocked by a foreign material, the processor 7 determines a presence of an "error" caused by the foreign material.

(3.7) Other Variations

Figure 12:
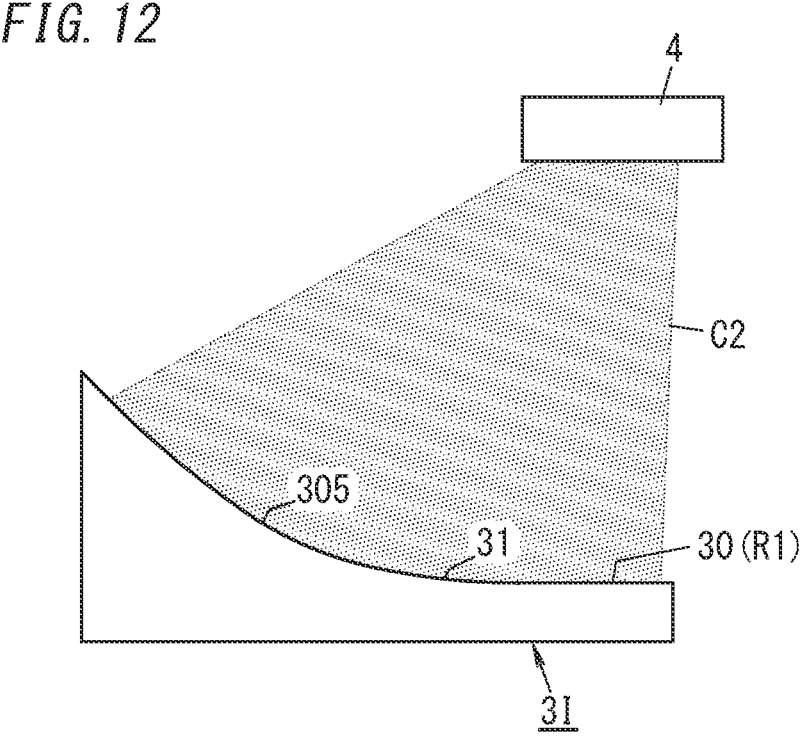
FIG. 12 is a schematic side view of a reflector of an optical encoder according to one of other variations of the embodiment.
Figure 13A:
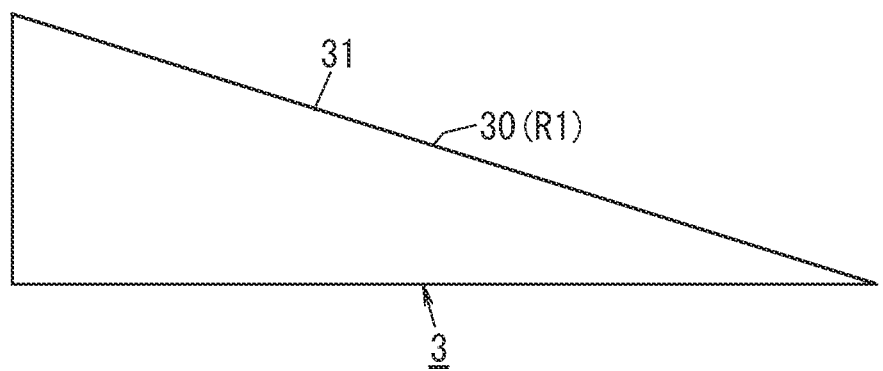
FIG. 13A and FIG. 13B are schematic side views of reflectors of optical encoders according to some of other variations of the embodiment.

In the basic example, each of the first face 31 and the second face 32 is a flat inclined surface with a straight shape when viewed laterally (refer to FIG. 13A). FIG. 13A is a schematic side view of the first face 31 of the basic example. In an alternative example, at least one of a first face 31 or a second face 32 may include a curved surface. FIG. 12 is a schematic side view of a reflector 3I of one of other variations. In the reflector 3I, the first face 31 has a curved inclination structure 305 including an inclined curved surface. This structure has the advantage of increasing the chance that a reflection light C2 is converged and then radiated to a light receiver 4, which further contributes to remedying the insufficiency in the amount of light. Note that both the first face 31 and the second face 32 may have the curved inclination structures 305, and their curvature radii may be different from each other.

Figure 13B:
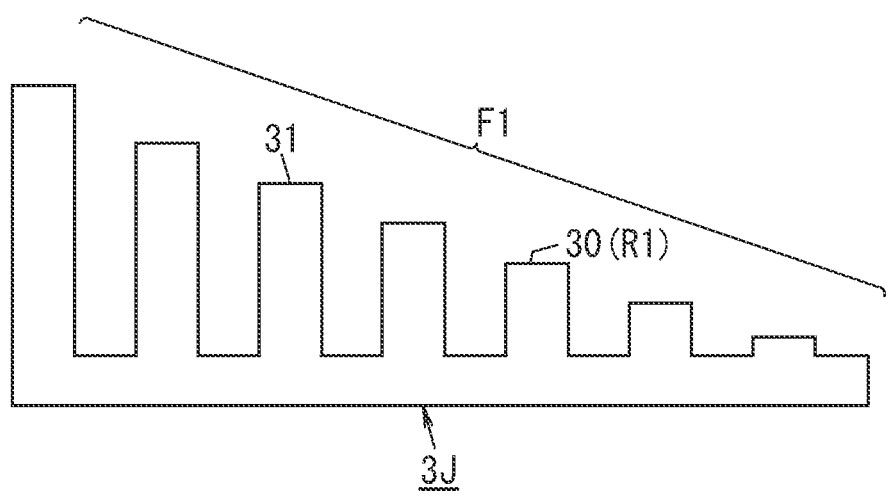

In the basic example, each of the first face 31 and the second face 32 is a flat inclined surface with a straight shape when viewed laterally (refer to FIG. 13A). In an alternative example, at least one of a first face 31 or a second face 32 may be inclined with an uneven structure F1 (refer to FIG. 13B). FIG. 13B is a schematic side view of a reflector 3J of one of other variations. In the reflector 3J, the first face 31 is inclined with the uneven structure F1 having a saw-like shape when viewed laterally. This structure has the advantage of increasing the chance that a reflection light C2 is radiated to a light receiver 4 according to a position of a light source 2.

In the basic example, a dimension ratio of the M-code area R1 to the incremental area R2 in the radial direction A2 is 1:1, and a dimension ratio of the M-code area R1 to the incremental area R2 in the circumferential direction of the rotating plate 5 is 1:1, but those ratios are not limited to "1:1" but may be changed if necessary.

In one variation of the basic example, a plurality of incremental areas R2 may be periodically arranged at predetermined intervals in another line different from one line in which a plurality of M-code areas R1 are arranged, as in the sixth variation. In this structure, faces of the incremental areas R2 each may have a level structure without being inclined with respect to the reference plane, as in the sixth variation.

Summary

As described above, an optical encoder (1) according to a first aspect includes a light source (2), a reflector (3, 3A to 3K), and a light receiver (4, 4C to 4J). The reflector (3, 3A to 3K) has a plurality of reflection areas (30) that include a plurality of M-code areas (R1) arranged in one line according to a specific bit pattern representing an M-code. The reflector (3, 3A to 3K) is configured to move together with a movement of an object (measurement object OB1) and is configured to reflect a light from the light source (2) by one or more areas (detection area X1), corresponding to n-bits, of the plurality of M-code areas (R1), where "n" is a natural number. The light receiver (4, 4C to 4J) is configured to receive a reflection light (C2) from the reflector (3, 3A to 3K) to perform a photoelectric conversion on the reflection light (C2). The plurality of M-code areas (R1) have a first face (31) corresponding to first code information (B1) which is one kind of one-bit information of the M-code, and a second face (32) corresponding to second code information (B2) which is another kind of the one-bit information of the M-code. The second face (32) has an inclination structure (D1) different from that of the first face (31). The light receiver (4, 4C to 4J) has a first light-receiving group (41) and a second light-receiving group (42). The first light-receiving group (41) includes a plurality of first light-receiving elements (401) arranged in one direction (line direction A1) to receive the reflection light (C2) reflected from the first face (31). The second light-receiving group (42) is disposed on a side farther away from the reflector (3, 3A to 3K) than the first light-receiving group (41) is. The second light-receiving group (42) includes a plurality of second light-receiving elements (402) arranged along the one direction (line direction A1) to receive the reflection light (C2) reflected from the second face (32). The first light-receiving group (41) and the second light-receiving group (42) are arranged such that positions of the first light-receiving elements (401) and positions of the second light-receiving elements (402) are shifted from each other in the one direction (line direction A1).

According to this aspect, the reflector (3, 3A to 3K) has the plurality of reflection areas (30) that include the M-code areas (R1) arranged in the one line. Moreover, the first light-receiving elements (401) and the second light-receiving elements (402), which receive the reflection light (C2), are positionally shifted from each other in the one direction (line direction A1). This aspect thus can contribute to increasing (almost twice) the amount of light reception in the light receiver (4, 4C to 4J) with a structure serving as the countermeasures to the phase shift of the light-receptive signal, for example. In other words, this aspect can contribute to increasing the amount of light reception in the light receiver (4, 4C to 4J) compared to a case where a plurality of M-code areas (R1) are provided in each of two lines as the countermeasure to the phase shift. It is consequently possible to remedy the insufficiency in the amount of light reception in the light receiver (4, 4C to 4J).

In an optical encoder (1) according to a second aspect, which may be implemented in conjunction with the first aspect, the plurality of reflection areas (30) further include a plurality of incremental areas (R2) corresponding to an incremental track. The plurality of incremental areas (R2) are periodically arranged at predetermined intervals in the one line.

This aspect can contribute to increasing the amount of light reception in the light receiver (4, 4C to 4J) compared to a case where incremental areas (R2) for obtaining an analog signal based on an incremental method are arranged in another line different from the line in which the plurality of M-code areas (R1) are arranged, for example.

In an optical encoder (1) according to a third aspect, which may be implemented in conjunction with the second aspect, the plurality of incremental areas (R2) have faces (third faces 33), each of which has an inclination structure (D1) different from any of those of the first face (31) and the second face (32).

This aspect can increase the chance of accurately distinguishing the analog signal based on the incremental method from the digital signal (first code information B1 and second code information B2).

In an optical encoder (1) according to a fourth aspect, which may be implemented in conjunction with the first aspect, the plurality of reflection areas (30) further include a plurality of incremental areas (R2) corresponding to an incremental track. The plurality of incremental areas (R2) are periodically arranged at predetermined intervals in a line different from the one line.

This aspect can increase the chance of accurately distinguishing an analog signal based on the incremental method from the digital signal, compared to a case where incremental areas (R2) for obtaining the analog signal based on an incremental method are arranged in the same line as that for a plurality of M-code areas (R1).

In an optical encoder (1) according to a fifth aspect, which may be implemented in conjunction with the fourth aspect, the plurality of incremental areas (R2) have faces, each of which has a level structure.

This aspect can contribute to simplifying the structure, compared to a case where each of faces of a plurality of incremental areas (R2) has an inclination structure.

In an optical encoder (1) according to a sixth aspect, which may be implemented in conjunction with any one of the second to fifth aspects, the light receiver (4, 4C to 4J) further has a third light-receiving group (43). The third light-receiving group (43) includes a plurality of third light-receiving elements (403) arranged along the one direction (line direction A1) to receive the reflection light (C2) reflected from faces (third faces 33) of the plurality of incremental areas (R2).

This aspect can increase the chance of accurately distinguishing the analog signal based on the incremental method from the digital signal (first code information B1 and second code information B2).

In an optical encoder (1) according to a seventh aspect, which may be implemented in conjunction with the sixth aspect, the third light-receiving group (43) is disposed on an either one or both of: a side closer to the reflector (3, 3A to 3K) than the first light-receiving group (41) and the second light-receiving group (42) are; and a side farther away from the reflector (3, 3A to 3K) than the first light-receiving group (41) and the second light-receiving group (42) are.

This aspect can increase the chance of further accurately distinguishing the analog signal based on the incremental method from the digital signal (first code information B1 and second code information B2).

In an optical encoder (1) according to an eighth aspect, which may be implemented in conjunction with the seventh aspect, the third light-receiving group (43) includes two light-receiving groups (43C, 43D) for parity check. The two light-receiving groups (43C, 43D) for parity check are respectively disposed on: a side closer to the reflector (3, 3A to 3K) than the first light-receiving group (41) and the second light-receiving group (42) are; and a side farther away from the reflector (3, 3A to 3K) than the first light-receiving group (41) and the second light-receiving group (42) are.

This aspect can contribute to increasing the amount of light reception in the light receiver (4, 4C to 4J) while realizing the parity check function.

In an optical encoder (1) according to a ninth aspect, which may be implemented in conjunction with the second aspect, the plurality of incremental areas (R2) have a first incremental area of which face has an inclination structure same as that of the first face (31). The plurality of incremental areas (R2) further have a second incremental area of which face has an inclination structure same as that of the second face (32).

This aspect can contribute to further increasing the amount of light reception in the light receiver (4, 4C to 4J).

In an optical encoder (1) according to a tenth aspect, which may be implemented in conjunction with the ninth aspect, the first light-receiving group (41) is disposed to receive the reflection light (C2) reflected from the first incremental area. The second light-receiving group (42) is disposed to receive the reflection light (C2) reflected from the second incremental area.

This aspect can contribute to further increasing the amount of light reception in the light receiver (4, 4C to 4J), since each of the first light-receiving group (41) and the second light-receiving group (42) doubles as a light-receiving group for receiving the reflection light (C2) reflected from the incremental areas (R2).

In an optical encoder (1) according to an eleventh aspect, which may be implemented in conjunction with any one of the first to tenth aspects, at least one of the first face (31) or the second face (32) includes a curved surface.

This aspect can contribute to increasing the chance that the reflection light (C2) is converged and then radiated to the light receiver (4, 4C to 4J).

In an optical encoder (1) according to a twelfth aspect, which may be implemented in conjunction with any one of the first to eleventh aspects, at least one of the first face (31) or the second face (32) is inclined with an uneven structure (F1).

This aspect can contribute to increasing the chance that the reflection light C2 is radiated to the light receiver (4, 4C to 4J) according to a position of the light source (2).

In an optical encoder (1) according to a thirteenth aspect, which may be implemented in conjunction with any one of the first to twelfth aspects, each of the first face (31) and the second face (32) is configured by two or more kinds of inclined surfaces.

This aspect can contribute to further increasing the amount of light reception in the light receiver (4, 4C to 4J) while realizing data compression with a higher compression ratio.

In an optical encoder (1) according to a fourteenth aspect, which may be implemented in conjunction with any one of the first to thirteenth aspects, the object (measurement object OB1) is a rotor. The reflector (3, 3A to 3K) is provided to a rotating plate (5) that rotates together with a rotation of the object (measurement object OB1).

According to this aspect, a rotary encoder is realized which contributes to remedying the insufficiency in the amount of light reception in the light receiver (4, 4C to 4J).

An optical encoder (1) according to a fifteenth aspect includes a light source (2), a reflector (3, 3A to 3K) and a light receiver (4, 4C to 4J). The reflector (3, 3A to 3K) has a plurality of reflection areas (30) that include a plurality of code areas (R0) arranged in one line according to a specific bit pattern. The reflector (3, 3A to 3K) is configured to move together with a movement of an object (measurement object OB1) and is configured to reflect a light from the light source (2) by one or more areas (detection area X1), corresponding to n-bits, of the plurality of code areas (R0), where "n" is a natural number. The light receiver (4, 4C to 4J) is configured to receive a reflection light (C2) from the reflector (3, 3A to 3K) to perform a photoelectric conversion on the reflection light (C2). The reflector (3, 3A to 3K) has three or more kinds of reflection areas (30) having inclination structures (D1) different from one another. The light receiver (4, 4C to 4J) has three or more light-receiving groups (41 to 43) respectively corresponding to and receiving light from the three or more kinds of reflection areas (30).

According to this aspect, the reflector (3, 3A to 3K) has the plurality of reflection areas (30) that include the code areas (R0) arranged in the one line. Moreover, the light receiver (4, 4C to 4J) has the three or more light-receiving groups (41 to 43) respectively corresponding to and receiving light from the three or more kinds of reflection areas (30). This aspect thus can contribute to increasing the amount of light reception in the light receiver (4, 4C to 4J) compared to a case where a plurality of code areas (R0) are provided in each of a plurality of lines. It is consequently possible to remedy the insufficiency in the amount of light reception in the light receiver (4, 4C to 4J).

In an optical encoder (1) according to a sixteenth aspect, which may be implemented in conjunction with the fifteenth aspect, the plurality of code areas (R0) have inclination structures (D1) different from each other. The inclination structures (D1) respectively correspond to bit arrays. Each of the bit arrays is configured by m bits, where "m" is a natural number smaller than "n." Adjacent bit arrays of the bit arrays are different from each other in arrayed bit pattern.

This aspect can contribute to further increasing the amount of light reception in the light receiver (4, 4C to 4J) while realizing data compression with a higher compression ratio.

In an optical encoder (1) according to a seventeenth aspect, which may be implemented in conjunction with the fifteenth or sixteenth aspect, the plurality of reflection areas (30) further include a plurality of incremental areas (R2) corresponding to an incremental track. The plurality of incremental areas (R2) are periodically arranged at predetermined intervals in a line different from the one line.

This aspect can contribute to increasing the chance of accurately distinguishing an analog signal based on the incremental method from the digital signal, compared to a case where incremental areas (R2) for obtaining the analog signal based on an incremental method are arranged in the same line as that for a plurality of code areas (R0).

In an optical encoder (1) according to an eighteenth aspect, which may be implemented in conjunction with the seventeenth aspect, the plurality of incremental areas (R2) have faces, each of which has a level structure.

This aspect can contribute to simplifying the structure, compared to a case where each of faces of a plurality of incremental areas (R2) has an inclination structure.

Note that the constituent elements according to the second to fourteenth aspects are not essential constituent elements for the optical encoder (1) according to the first aspect but may be omitted as appropriate. The constituent elements according to the sixteenth to eighteenth aspects are not essential constituent elements for the optical encoder (1) according to the fifteenth aspect but may be omitted as appropriate.

REFERENCE SIGNS LIST

1 Optical Encoder
2 Light Source
3, 3A to 3K Reflector
30 Reflection Area
31 First Face
32 Second Face
4, 4C to 4J Light Receiver
41 First Light-receiving group
42 Second Light-receiving group
43 Third Light-receiving group
401 First Light-receiving element
402 Second Light-receiving element
5 Rotating Plate
A1 Line Direction (One Direction)
B1 First Code Information
B2 Second Code Information
C2 Reflection Light
D1 Inclination structure
F1 Uneven Structure
OB1 Measurement Object (Object)
R0 Code Area
R1 M-code Area
R2 Incremental Area
X1 Detection Area

The invention claimed is:

1. An optical encoder, comprising:
a light source;
a reflector having a plurality of reflection areas that include a plurality of M-code areas arranged in one line according to a specific bit pattern representing an M-code, the reflector being configured to move together with a movement of an object, the reflector being configured to reflect a light from the light source by one or more areas, corresponding to n-bits, of the plurality of M-code areas, where "n" is a natural number; and
a light receiver configured to receive a reflection light from the reflector to perform a photoelectric conversion on the reflection light,
the plurality of M-code areas having
a first face corresponding to first code information which is one kind of one-bit information of the M-code, and
a second face corresponding to second code information which is another kind of the one-bit information of the M-code, the second face having an inclination structure different from that of the first face,
the light receiver having
a first light-receiving group including a plurality of first light-receiving elements arranged in one direction to receive the reflection light reflected from the first face, and
a second light-receiving group disposed on a side farther away from the reflector than the first light-receiving group is, the second light-receiving group including a plurality of second light-receiving elements arranged along the one direction to receive the reflection light reflected from the second face,
the first light-receiving group and the second light-receiving group being arranged such that positions of the first light-receiving elements and positions of the second light-receiving elements are shifted from each other in the one direction.

2. The optical encoder of claim 1, wherein
the plurality of reflection areas further include a plurality of incremental areas corresponding to an incremental track, the plurality of incremental areas being periodically arranged in the one line at predetermined intervals.

3. The optical encoder of claim 2, wherein
the plurality of incremental areas have faces, each of which has an inclination structure different from any of those of the first face and the second face.

4. The optical encoder of claim 1, wherein
the plurality of reflection areas further include a plurality of incremental areas corresponding to an incremental track, the plurality of incremental areas being periodically arranged at predetermined intervals in a line different from the one line.

5. The optical encoder of claim 4, wherein
the plurality of incremental areas have faces, each of which has a level structure.

6. The optical encoder of claim 2, wherein
the light receiver further has a third light-receiving group that includes a plurality of third light-receiving elements arranged along the one direction to receive the reflection light reflected from faces of the plurality of incremental areas.

7. The optical encoder of claim 6, wherein
the third light-receiving group is disposed on an either one or both of
a side closer to the reflector than the first light-receiving group and the second light-receiving group are and
a side farther away from the reflector than the first light-receiving group and the second light-receiving group are.

8. The optical encoder of claim 7, wherein
the third light-receiving group includes two light-receiving groups for parity check,
the two light-receiving groups for parity check are respectively disposed on both of
a side closer to the reflector than the first light-receiving group and the second light-receiving group are and
a side farther away from the reflector than the first light-receiving group and the second light-receiving group are.

9. The optical encoder of claim 2, wherein
the plurality of incremental areas have
a first incremental area of which face has an inclination structure same as that of the first face, and
a second incremental area of which face has an inclination structure same as that of the second face.

10. The optical encoder of claim 9, wherein
the first light-receiving group is disposed to receive the reflection light reflected from the first incremental area, and
the second light-receiving group is disposed to receive the reflection light reflected from the second incremental area.

11. The optical encoder of claim 1, wherein
at least one of the first face or the second face includes a curved surface.
12. The optical encoder of claim 1, wherein
at least one of the first face or the second face is inclined with an uneven structure.
13. The optical encoder of claim 1, wherein
each of the first face and the second face is configured by two or more kinds of inclined surfaces.
14. The optical encoder of claim 1, wherein
the object is a rotor, and
the reflector is provided to a rotating plate that rotates together with a rotation of the object.
15. An optical encoder, comprising:
a light source;
a reflector having a plurality of reflection areas that include a plurality of code areas arranged in one line according to a specific bit pattern, the reflector being configured to move together with a movement of an object, the reflector being configured to reflect a light from the light source by one or more areas, corresponding to n-bits, of the plurality of code areas, where "n" is a natural number; and
a light receiver configured to receive a reflection light from the reflector to perform a photoelectric conversion on the reflection light,
the reflector having three or more kinds of reflection areas having inclination structures different from one another,
the light source being disposed to simultaneously irradiate at least three kinds of reflection areas, out of the three or more kinds of reflection areas,
the light receiver having three or more light-receiving groups respectively corresponding to and receiving light from the three or more kinds of reflection areas.
16. The optical encoder of claim 15, wherein
the plurality of code areas have inclination structures different from each other, the inclination structures respectively corresponding to bit arrays, each of which is configured by m-bits, where "m" is a natural number smaller than "n", and
adjacent bit arrays of the bit arrays are different from each other in arrayed bit pattern.
17. The optical encoder of claim 15, wherein
the plurality of reflection areas further include a plurality of incremental areas corresponding to an incremental track, the plurality of incremental areas being periodically arranged at predetermined intervals in a line different from the one line.
18. The optical encoder of claim 17, wherein
the plurality of incremental areas have faces, each of which has a level structure.
19. An optical encoder, comprising:
a light source;
a reflector having a plurality of reflection areas that include a plurality of code areas arranged in one line according to a specific bit pattern, the reflector being configured to move together with a movement of an object, the reflector being configured to reflect a light from the light source by one or more areas, corresponding to n-bits, of the plurality of code areas, where "n" is a natural number; and
a light receiver configured to receive a reflection light from the reflector to perform a photoelectric conversion on the reflection light,
the reflector having three or more kinds of reflection areas having inclination structures different from one another,
the light receiver having three or more light-receiving groups respectively corresponding to and receiving light from the three or more kinds of reflection areas, wherein
the plurality of code areas have inclination structures different from each other, the inclination structures respectively corresponding to bit arrays, each of which is configured by m-bits, where "m" is a natural number smaller than "n," and
adjacent bit arrays of the bit arrays are different from each other in arrayed bit pattern.

* * * * *